US011117979B2

(12) United States Patent
Trapp et al.

(10) Patent No.: US 11,117,979 B2
(45) Date of Patent: Sep. 14, 2021

(54) PROCESSES AND APPARATUS FOR BIMODAL SLURRY POLYMERIZATION

(71) Applicant: ExxonMobil Chemical Patents Inc., Baytown, TX (US)

(72) Inventors: Keith W. Trapp, Kingwood, TX (US); Scott T. Roger, Porter, TX (US); James A. Kendrick, Greenwell Springs, LA (US); Edward F. Smith, Doylestown, PA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/998,251

(22) Filed: Aug. 20, 2020

(65) Prior Publication Data
US 2021/0079125 A1 Mar. 18, 2021

Related U.S. Application Data

(60) Provisional application No. 62/899,830, filed on Sep. 13, 2019.

(51) Int. Cl.
*C08F 2/01* (2006.01)
*B01D 5/00* (2006.01)
(Continued)

(52) U.S. Cl.
CPC .............. *C08F 2/01* (2013.01); *B01D 5/0003* (2013.01); *B01J 8/005* (2013.01); *B01J 8/0015* (2013.01);
(Continued)

(58) Field of Classification Search
CPC .. C08F 210/16; C08F 2/06; C08F 2/14; C08F 110/02; C08F 6/02; C08F 2/38;
(Continued)

(56) References Cited

U.S. PATENT DOCUMENTS 3,152,872 A 10/1964 Scoggin et al.
4,424,341 A 1/1984 Hanson et al.
(Continued)

OTHER PUBLICATIONS

Allemeersch, P., (Dec. 2015), "Introduction to the Slurry Loop Process", Polymerisation of Ethylene: In Slurry Loop Reactors (Dec. 31, 2015), pp. 1-18.

*Primary Examiner* — William K Cheung
(74) *Attorney, Agent, or Firm* — ExxonMobil Chemical Patents Inc.—Law Department

(57) ABSTRACT

Processes and apparatus for preparing bimodal polymers are provided. In some embodiments, processes include introducing a monomer, a first diluent, a catalyst, hydrogen, at a first hydrogen concentration, and optional comonomer, to a first loop reactor to produce, under polymerization conditions, a first slurry of polymer solids. Processes may also include continuously discharging the first slurry of polymer solids from the loop reactor as a first polymerization effluent to a first flash tank; separating the first polymerization effluent in the first flash tank to provide a first concentrated polymer slurry with significantly lower hydrogen concentration; and transferring the first concentrated polymer slurry from the flash tank to a re-slurry mixer. Processes may further include introducing a re-slurry mixer diluent to the first concentrated polymer slurry to form a second concentrated polymer slurry in the re-slurry mixer that can be pumped to a second slurry loop reactor.

24 Claims, 6 Drawing Sheets

(51) Int. Cl.
*B01J 8/00* (2006.01)
*B01J 19/24* (2006.01)
*C08F 2/06* (2006.01)
*C08F 6/02* (2006.01)
*C08F 6/10* (2006.01)
*C08F 110/02* (2006.01)
*C08F 210/16* (2006.01)

(52) U.S. Cl.
CPC ............... *B01J 19/242* (2013.01); *C08F 2/06* (2013.01); *C08F 6/02* (2013.01); *C08F 6/10* (2013.01); *C08F 110/02* (2013.01); *C08F 210/16* (2013.01); *B01J 2219/0004* (2013.01); *B01J 2219/00042* (2013.01)

(58) Field of Classification Search
CPC .... C08F 6/10; C08F 10/02; C08F 2/01; C08F 10/10; C08F 2500/05; C08F 2/001; B01D 5/0003; B01J 8/0015; B01J 8/004; B01J 8/005; B01J 19/242; B01J 4/008; B01J 2219/00042; B01J 2208/00761; B01J 2208/00628; B01J 2208/00769; B01J 2219/0004; B01J 2231/12; B01J 2204/005; B01J 2208/00663

USPC ........................................................ 526/64
See application file for complete search history.

(56) References Cited

U.S. PATENT DOCUMENTS

| | | | |
|---|---|---|---|
| 6,204,344 B1 | 3/2001 | Kendrick et al. | |
| 6,281,300 B1 | 8/2001 | Kendrick | |
| 6,380,325 B1 | 4/2002 | Kendrick | |
| 6,586,537 B2 | 7/2003 | Marissal et al. | |
| 6,921,804 B2 | 7/2005 | Mutchler et al. | |
| 6,924,340 B2 | 8/2005 | McGrath | |
| 8,202,951 B2* | 6/2012 | Koch | C08F 10/02 526/64 |
| 8,653,206 B2 | 2/2014 | Gessner et al. | |
| 8,987,390 B2 | 3/2015 | Bhandarkar et al. | |
| 9,556,283 B2 | 1/2017 | Bhandarkar et al. | |
| 9,605,092 B2 | 3/2017 | Parisel et al. | |
| 2007/0274873 A1* | 11/2007 | Kendrick | B01J 8/382 422/132 |
| 2012/0316296 A1* | 12/2012 | Vandaele | G01N 1/2035 526/60 |

* cited by examiner

PROCESSES AND APPARATUS FOR BIMODAL SLURRY POLYMERIZATION

CROSS REFERENCE TO RELATED APPLICATION

This application claims the benefit of U.S. Provisional Application 62/899,830 filed Sep. 13, 2019 entitled "PROCESS AND APPARATUS FOR BIMONDAL SLURRY POLYMERIZATION", the entirety of which is incorporated by reference herein.

FIELD

The present disclosure relates to processes and apparatus for bimodal slurry polymerization.

BACKGROUND

In response to the demand for higher performance high density polymers for film, pipe and molding products, unimodal polymers used for such applications can be mixed with an additional polymer in a post-reactor modification to form a bimodal polymer blend having a low molecular weight homopolymer and a high molecular weight copolymer. Such post-reactor blends provide an improved high density blend having better crack resistance as well as processability, as compared to the low molecular weight homopolymer alone. However, post-reactor blending adds additional costs and slows down overall production of bimodal polymers and produces a more inconsistent product.

Bimodal polymers from blending of two polymers can also be formed using reactors in series using a single or multiple catalysts or dual site catalysts. Either sequence can be used to produce the two different polymers. A preferred option is series reactor operation to produce the low molecular weight homopolymer in a first reactor and then the high molecular weight copolymer in a second reactor. However, the challenge for this mode is that hydrogen ($H_2$) needs to be sufficiently purged from any polymer mixture being introduced into the second reactor in series because much lower levels of $H_2$ are typically used (and/or tolerated) in the second reactor.

There is a need for improved polymerization processes and apparatuses for providing bimodal polymers.

References of potential interest include: U.S. Pat. Nos. 6,586,537; 6,204,344; 6,921,804; 6,924,340; 8,202,951; 8,653,206; 8,987,390; 9,556,283; 9,605,092; 6,281,300; 3,152,872; 4,424,341; 6,380,325.

SUMMARY

In at least one embodiment, a process for preparing polymers includes introducing a monomer, a first diluent, a catalyst, hydrogen, at a first hydrogen concentration, and optional comonomer, to a first loop reactor to produce, under polymerization conditions, a first slurry of polymer solids. The process includes discharging the first slurry of polymer solids from the loop reactor as a first polymerization effluent to a high pressure flash tank, wherein the high pressure flash tank has a seal chamber configured to maintain a volume of a first concentrated polymer slurry to maintain a seal. The process further includes separating the first polymerization effluent in the high pressure flash tank to vaporize from about 50% to about 100% of the first diluent and provide a flash vapor comprising the first diluent and unreacted monomer, and to provide the first concentrated polymer slurry, wherein hydrogen is present in the first concentrated polymer slurry exiting the high pressure flash tank at a second hydrogen concentration that is lower than the first hydrogen concentration. The process includes transferring the first concentrated polymer slurry from the high pressure flash tank to a re-slurry mixer. The process includes introducing a second diluent to the first concentrated polymer slurry to form a second concentrated polymer slurry in the re-slurry mixer. The process further includes discharging the second concentrated polymer slurry from the re-slurry mixer into a second loop reactor.

DETAILED DESCRIPTION

Figure 1A:
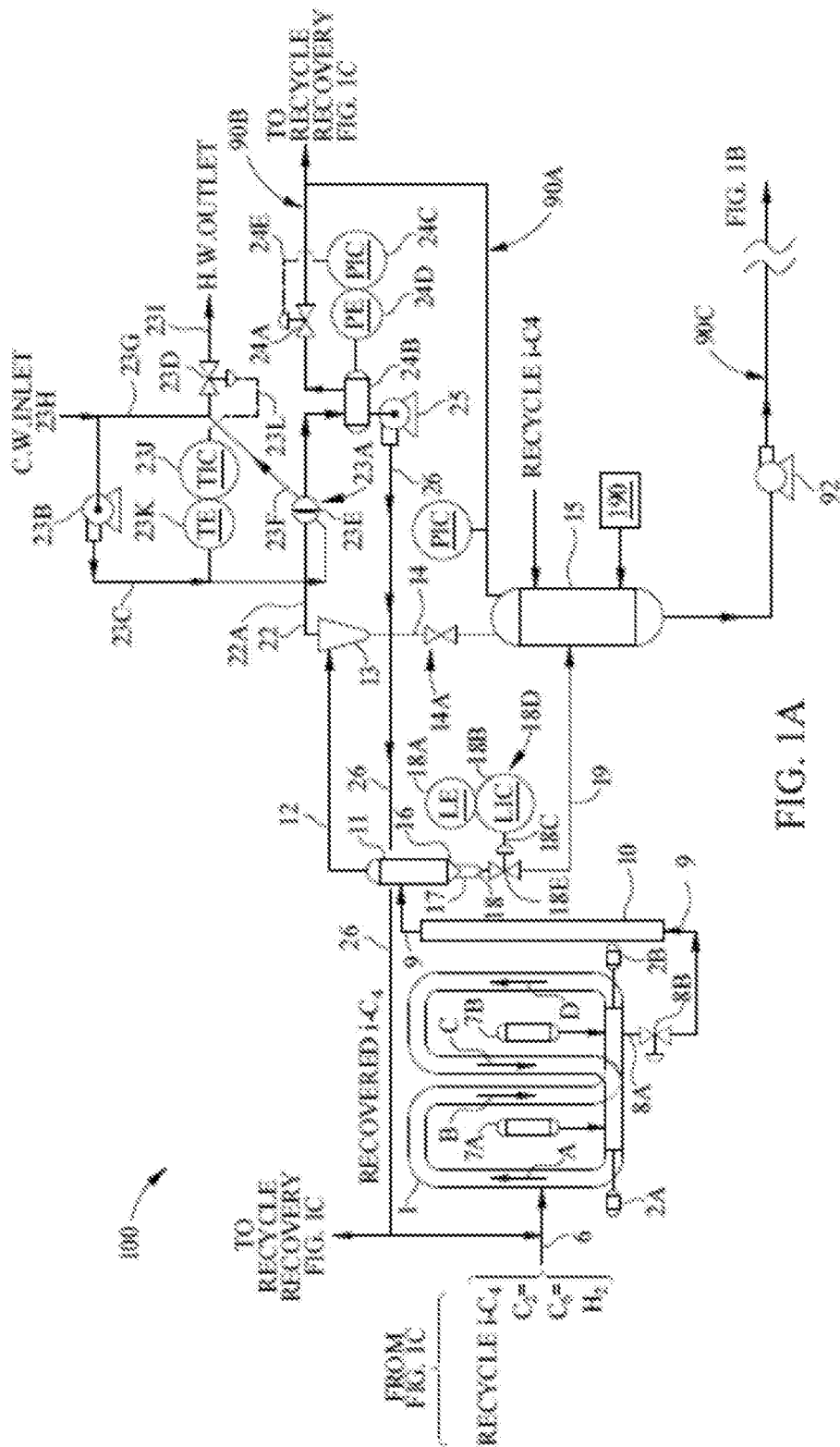
FIG. 1A is a diagram illustrating an apparatus for forming bimodal polymers, according to an embodiment.

The following abbreviations may be used herein: wt % is weight percent, vol % is volume percent, mol % is mole percent, psig is pounds per square inch gauge, ppm is parts per million, rpm is rotation per minute, HPFT is high pressure flash tank, LPFT is low pressure flash tank, l/d ratio is the length/diameter ratio, LE is level element, LIC is level indicating controller, TE is temperature element, TIC is temperature indicating controller, PE is pressure element, PIC is pressure indicating controller, FE is flow element, FIC is flow indicating controller, and RMT is Re-slurry Mix Tank. As used herein, the term "purge column" means a vessel where residual hydrocarbons are removed from the resin granules and should be familiar to someone skilled in the art of HDPE. The vessel is typically operated with an inventory of resin granules inside of it to maintain sufficient residence time for the removal of the residual hydrocarbons. Typically, this is a cylindrical vessel that has straight sides and a conical bottom designed such that the resin granules exhibit mass flow wherein each granule undergoes similar residence time in the vessel. The hydrocarbons are typically removed from the granules in this vessel by the counter-flow of nitrogen that has little to no residual hydrocarbons in it. The nitrogen can be introduced in more than one location in the vessel but is typically injected near the bottom of the vessel to allow for increased contact time between the granules and the nitrogen.

The term "continuous" means a system that operates without interruption or cessation. For example a continuous process to produce a polymer would be one where the reactants are continually introduced into one or more reactors and polymer product is continually withdrawn.

As used herein, the term "polymerization slurry" means substantially a two phase composition including polymer solids and liquid circulating within a loop reactor. The solids include catalyst and a polymerized olefin, such as polyethylene. The liquids include an inert diluent, such as isobutane, with dissolved monomer, comonomer, molecular weight control agents, such as hydrogen, antistatic agents, antifouling agents, scavengers, and other process additives.

Unless otherwise indicated, as used herein, "low molecular weight polymer" may be a polymer having one or more of (e.g., each of): a GPC average molecular weight distribution with a Mw value of from about 10,000 g/mol to about 100,000 g/mol, a Mn value of from about 3,000 g/mol to about 30,000 g/mol, a Mz value of from about 20,000 g/mol to about 200,000, a PDI of from about 2.0 to about 8.0, and/or a density of from about 0.930 g/cm$^3$ to about 0.980 g/cm$^3$.

Unless otherwise indicated, as used herein, "high molecular weight polymer" may be a polymer having one or more of (e.g., each of): a Mw value of from about 100,000 g/mol to about 1,000,000 g/mol, Mn value of from about 30,000 g/mol to about 300,000 g/mol, Mz value of from about 200,000 g/mol to about 4,000,000 g/mol, a PDI of from about 2.0 to about 8.0, and/or a density of from about 0.900 g/cm$^3$ to about 0.930 g/cm$^3$.

Mw, Mn, Mz, and PDI (Mw/Mn) can be determined by using a High Temperature Gel Permeation Chromatography (Tosoh Bioscience LLC), equipped with a differential refractive index detector (DRI). Three high temperature TSK gel columns (Tosoh GMHHR-H(30)HT2) are used. The nominal flow rate is 1.0 mL/min, and the nominal injection volume is 300 μL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of Aldrich reagent grade 1,2,4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 mg/mL to 2.0 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined by combining universal calibration relationship with the column calibration which is performed with a series of monodispersed polystyrene (PS) standards. The MW is calculated at each elution volume with the following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $\alpha_{PS}=0.67$ and $K_{PS}=0.000175$ while $\alpha_X$ and $K_X$ are obtained from published literature. Specifically, α/K=0.695/0.000579 for polyethylene and 0.705/0.0002288 for polypropylene.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, do/dc=0.109 for both polyethylene and polypropylene.

The mass recovery is calculated from the ratio of the integrated area of the concentration chromatography over elution volume and the injection mass which is equal to the pre-determined concentration multiplied by injection loop volume.

In this method, $\alpha_{PS}=0.67$ and $K_{PS}=0.000175$ while α and K are for other materials as calculated and published in literature (Sun, T. et al. *Macromolecules* 2001, 34, 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively.

$$w2 = f * SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * \text{bulk } CH3/1000TC$$

$$\text{bulk } SCB/1000TC = \text{bulk } CH3/1000TC - \text{bulk}\frac{CH3end}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

As used herein, the term "space time yield" (STY) means the production rate of polymer per unit of loop reactor volume or polymerization slurry volume, and the STY is expressed in terms of pounds per hour-gallon (lbs/hr-gal).

As used herein, the term "polymer residence time" means the average duration that a polymer particle remains within a loop reactor.

A "reaction zone" also referred to as a "polymerization zone" is a vessel where polymerization takes place, for example a stirred-tank reactor or a loop reactor. When multiple reactors are used in a continuous polymerization process, each reactor is considered as a separate polymerization zone. In at least one embodiment, the polymerization occurs in each reaction zone.

In the present disclosure, a "seal chamber" is an extension of a flash tank that is configured to maintain a volume of a slurry of polymer solids to maintain a seal and a pressure. As used herein, "seal chamber" and "seal leg" are used interchangeably.

The term "fines" includes "polymer fines" and/or "catalyst fines" derived from the feed solid materials, and defines a portion of the entrained catalyst and polymer solids not removed by a separator or any removal/purification system. The fines are generally much smaller in size than the size of the polymer solids in the reactor slurry. The fines can include unreacted and/or under-reacted catalyst.

As used herein, an "olefin," alternatively referred to as "alkene," is a linear, branched, or cyclic compound of carbon and hydrogen having at least one double bond.

An "alpha-olefin", refers to an olefin having a terminal carbon-to-carbon double bond in the structure thereof $((R^x R^y)-C=CH_2$, where $R^x$ and $R^y$ can be independently hydrogen or any hydrocarbyl group, such as $R^x$ is hydrogen, and $R^y$ is an alkyl group). In other words, an "alpha-olefin" is an olefin having a double bond at the alpha (or 1-) position.

As used herein, a "first diluent" is a diluent feed to the first loop reactor. The terms "first diluent" and "first reactor diluent" are used interchangeably herein. The first diluent can be a blend of the recovered diluent from the condensed vapor from the first flash drum and recycled $iC_4$ from one or more recycle towers.

As used herein, a "second diluent" is a diluent feed to the re-slurry mixer. The terms "second diluent" and "re-slurry mixer diluent" are used interchangeably herein. The second diluent can be the recycled $iC_4$ from the recycle towers or another diluent source that has little or no olefin content (e.g., ethylene) to avoid polymerization from occurring in the re-slurry mixer. The second diluent is added to the re-slurry mixer to dilute the first concentrated slurry so that the slurry can be pumped to a second reactor.

As used herein, a "third diluent" is the feed to the second loop reactor. The terms "third diluent" and "second reactor diluent" are used interchangeably herein. The third diluent can be a blend of the recovered diluent from the condensed vapor from the second and/or third flash drum vapors and/or recycled $iC_4$ from one or more recycle towers.

Recycled diluent can also be used for flushing of the catalyst and the reactor pumps, which involve little to no olefin content in order to avoid polymerization. The recovered diluent can be used for energy efficiency. Excess recovered diluent can be sent to the recycle tower system.

Processes and Apparatus

The present disclosure relates to processes for manufacturing olefin polymers using at least two reactors configured in series (e.g., slurry reactors), which can be elongated tubular closed loop reactors. In at least one embodiment, processes and apparatuses of the present disclosure include at least two slurry reactors, one or more flash volatile recovery systems (e.g., flash tanks), and a re-slurry mixer. The present disclosure relates to processes and apparatus for bimodal slurry polymerization, thus providing low molecular weight polymers, such as low molecular weight homopolymers, and high molecular weight polymers, such as high molecular weight copolymers.

Methods and apparatus of the present disclosure can provide reduced or eliminated hydrogen content in a second reactor in series to provide bimodal polymers at high throughput and reduced cost, as compared to conventional post reactor blends and in-series reactors/processes.

In at least one embodiment, the present disclosure provides a process for preparing polymers including introducing a monomer, a first reactor diluent, a catalyst, co-catalyst and hydrogen, at a first hydrogen concentration, and optional comonomer, to a loop reactor to produce, under polymerization conditions, a first slurry of polymer solids. The method includes discharging (e.g., continuously) the first slurry of polymer solids from the loop reactor as a first polymerization effluent to a high pressure flash tank. The high pressure flash tank can have a seal chamber configured to maintain a volume of a first concentrated polymer slurry to maintain a pressure seal. The method can include separating the first polymerization effluent in the high pressure flash tank to vaporize from about 50% to about 100% of the first reactor diluent and provide a flash vapor including the first reactor diluent and unreacted monomer, and hydrogen to provide the first concentrated polymer slurry. Hydrogen can be present in the first concentrated polymer slurry exiting the high pressure flash tank at a second hydrogen concentration that is lower than the first reactor slurry hydrogen concentration. The method can include transferring the first concentrated polymer slurry from the high pressure flash tank to a re-slurry mixer and introducing a re-slurry mixer diluent (a second diluent) to the first concentrated polymer slurry to form a second concentrated polymer slurry. The method can include transferring the second concentrated polymer slurry into a second loop reactor via a pump.

Producing the low molecular weight polymer in the first reactor in series can provide:

Easier balance of catalyst activity between the reactors. The production of low molecular weight polymer with $H_2$ typically can cause lower productivity than production of the high molecular weight with minimal $H_2$.

Easier control of the low molecular weight polymer properties as the polymer can be sampled at the first reactor outlet, as well as monitoring the monomer conversion and the catalyst activity.

Avoidance of the production of very high molecular weight gels, as well as facilitating a homogeneous blend of the polymer solids, which are composed of high molecular weight polymer and low molecular weight polymer, in the product extruder, thus producing a product having greater homogeneity.

Methods and apparatus of the present disclosure can provide reduced or substantially eliminated hydrogen content in the second reactor in series to provide bimodal polymers.

In at least one embodiment, the present disclosure provides an apparatus for continuously recovering polymer solids from a polymerization effluent including a slurry of the polymer solids in a liquid medium including an inert diluent and unreacted monomers. As used herein, "polymerization effluent" and "polymerization slurry" can be used interchangeably. The apparatus can include a discharge valve on a slurry reactor, examples of which include slurry loop reactors, for the continuous discharge of a portion of the slurry reactor contents into a first transfer conduit. The first transfer conduit may be coupled with a flash line heater. The apparatus can further include a first flash tank (e.g., a high pressure flash tank) having a bottom defined by substantially straight sides inclined at an angle to the horizontal equal to or greater than the angle of slide of the slurry/polymer solids, where the pressure of the first flash tank and temperature of the polymerization effluent are such that from about 50% to about 100% of the liquid medium will be vaporized and the inert diluent component of the vapor is condensable, without compression, by heat exchange with a fluid having a temperature of about 18° C. to about 60° C. The apparatus includes a first flash tank exit seal chamber, coupled with the first flash tank, of such a length (l) and diameter (d) as to permit such a level of concentrated polymer solids/slurry to accumulate and form a pressure seal in the first flash tank exit seal chamber. The apparatus further includes a seal chamber exit reducer providing for a continuous discharge of a plug flow of concentrated polymer solids/slurry to a second transfer conduit. In at least one embodiment, the apparatus includes a re-slurry mixer communicating with the second transfer conduit. The re-slurry mixer can be operated such that polymerization does not occur in the re-slurry mixer. The re-slurry mixer may be vented in order to control the pressure in the re-slurry mixer. The apparatus can further include a second slurry reactor coupled with the re-slurry mixer, where a concentrated slurry from the re-slurry mixer is then transferred via a third transfer conduit and pump to the second slurry reactor. The apparatus can include a second discharge valve on the second slurry reactor, examples of which include slurry loop reactors, for the continuous discharge of a portion of the second slurry reactor contents into a fourth transfer conduit. The fourth transfer conduit may be coupled with a flash line heater. The apparatus can further include a second flash tank (e.g., a high pressure flash tank) having a bottom defined by substantially straight sides inclined at an angle to the horizontal equal to or greater than the angle of slide of the slurry/polymer solids, where the pressure of the second flash tank and temperature of the polymerization effluent are such that from about 50% to about 100% of the liquid medium will be vaporized and the inert diluent component of the vapor is condensable, without compression, by heat exchange with a fluid having a temperature of about 18° C. to about 60° C. The apparatus can further include a second flash tank exit seal chamber, coupled with the second flash tank, of such a length (l) and diameter (d) as to permit a level of concentrated polymer solids/slurry to accumulate and form a pressure seal in the second flash tank exit seal chamber. The apparatus can further include a seal chamber exit reducer providing for a continuous discharge of a plug flow of concentrated polymer solids/slurry to a fifth transfer conduit. The apparatus can further include a third flash tank (e.g., a low pressure flash tank) where the pressure of the third flash tank and temperature of the concentrated polymer solids/slurry are such that essentially all of any remaining inert diluent and/or unreacted monomer will be vaporized and removed overhead for condensation by compression and heat exchange, and the polymer solids are discharged from the bottom of the third flash tank for additional processing or storage. Alternately, a low pressure purge column can be used for the third flash drum.

Methods can include increasing the heat content of the polymerization effluent during its transit through a first transfer conduit to a temperature below the fusion point of the polymer while continuously communicating the polymerization effluent to a first flash tank (e.g., high pressure flash tank). Methods can include continuously discharging the concentrated polymer solids/slurry from the first flash tank exit seal chamber having such a length (l) and diameter (d) that a volume of concentrated polymer solids/slurry is continuously maintained so as to form a pressure seal in the first flash tank exit seal chamber. Methods can include continuously discharging the concentrated polymer solids/slurry from the first flash tank seal chamber through a seal chamber exit reducer. Methods can include communicating a continuous plug flow of concentrated polymer solids/slurry from the first flash tank exit seal chamber through the seal chamber exit reducer to a second transfer conduit which communicates the continuous plug flow of concentrated polymer solids/slurry to a re-slurry mixer. Methods can include continuously discharging the concentrated polymer solids/slurry from the re-slurry mixer to a second loop reactor through a third transfer conduit. Methods can include introducing more monomer as well as a comonomer in the second loop reactor to produce a second slurry of polymer solids comprising one or more copolymers. Hydrogen can be present in the second slurry of polymer solids exiting the second loop reactor (at a third hydrogen concentration) at a significantly lower concentration than the polymer solids of the first loop reactor. Methods can include increasing the heat content of the polymerization effluent during its transit through a fourth transfer conduit to a temperature below the fusion point of the polymer while continuously communicating the polymerization effluent to a second flash tank (e.g., high pressure flash tank) having a bottom defined by substantially straight sides inclined at an angle to the horizontal equal to or greater than the angle of slide of the concentrated polymer solids/slurry. Methods can include continuously vaporizing essentially all of any remaining inert diluent and/or unreacted monomer in a third flash tank operated at a lower pressure than the second flash tank. Methods can include condensing the vaporized inert diluent and/or unreacted monomer from the third flash tank by compression and heat exchange. Methods can include continuously discharging the essentially dried polymer slurry from the third flash tank for further processing or storage. In at least one embodiment, the first hydrogen concentration is greater than the second hydrogen concentration and/or the third hydrogen concentration, and the second hydrogen concentration is equal to or greater than the third hydrogen concentration. For example, the first hydrogen concentration of the first concentrated polymer slurry can be 0.5 mol % to 3.5 mol %, and little to no hydrogen is present in the first concentrated polymer slurry and the second loop reactor. For example, the second hydrogen concentration can be about 1,000 ppm $H_2$ or less, such as about 100 $H_2$ ppm or less. The third hydrogen concentration can be about 100 ppm $H_2$ or less, such as about 10 ppm $H_2$ or less. In an alternate embodiment, the first hydrogen concentration is lower than the third hydrogen concentration.

The present disclosure also relates to processes and apparatus for capturing a higher weight percentage of polymer solids from a circulating slurry in a loop reactor than the weight percentage of solids in the circulating slurry. The apparatus includes a conduit having a first end, wherein the first end extends for a distance into the loop reactor. The conduit also has portions defining an opening wherein the opening is positioned relative to the direction of the circulating slurry. In at least one embodiment, the opening is facing the direction of flow of the circulating slurry. Additionally, a portion of the conduit may extend outwardly from the loop reactor for discharging, continuously or otherwise the polymer solids from the loop reactor.

The present disclosure further provides apparatus and processes for producing polymers from a polymerization slurry in one or more loop reactors operating at a space time yield of about 2.6 lbs/hr-gal or greater. In further embodiments, the polymerization effluent can be heated in the first transfer conduit (via a flash line heater) to a temperature below the fusion temperature of the polymer solids. The heated polymerization effluent is communicated through the first transfer conduit to a first flash tank (e.g., a high pressure flash tank). In the first flash tank, from about 50% to about 100% of the liquid medium including the first reactor diluent can be vaporized, forming a first concentrated polymer slurry.

The vapors from the first flash tank (e.g., a high pressure flash tank) can be sent to a separator (e.g., a cyclone). The first separator vapors can be further condensed with an exchanger (e.g., CTW exchanger) into an accumulator drum. Process computer control of the pressure of the liquid accumulator and the temperature of the condenser facilitates removal of $H_2$ and a reversible gaseous poison (e.g., CO), which can be added to avoid fouling in the first flash tank and the separator). In at least one embodiment, a process computer controller is used to provide the recovered diluent and monomer to the first slurry loop reactor along with the recycled diluent, the monomer (e.g., ethylene), and the $H_2$ feed. Any excess recovered diluent flow can be sent to one or more recycle towers for further purification. In at least one embodiment, the concentration of the first concentrated polymer slurry is adjusted in the re-slurry mixer with a re-slurry mixer diluent based on the pumping requirements, which may be 40 wt %-65 wt % of polymer slurry, such as 45 wt %-55 wt %, based on the total weight of the polymer slurry and the diluent in the re-slurry mixer. Furthermore, the re-slurry mixer pressure is vented to the recovery system for pressure control, to be equal to or lower than the pressure of the high pressure flash tank.

In at least one embodiment, the first concentrated polymer slurry including polymer solids is discharged from the first flash tank to a re-slurry mixer. A re-slurry mixer diluent can be introduced to the first concentrated polymer slurry to form a second concentrated polymer slurry in the re-slurry mixer. The re-slurry mixer diluent is the recycled diluent that has been treated/purified to have a low monomer concentration to prevent polymerization.

The second concentrated polymer slurry from the re-slurry mixer is discharged from the re-slurry mixer to a second loop reactor through a third transfer conduit with a pump. Polymerization processes in the second loop reactor can include introducing additional monomer and a co-monomer to a third diluent in the second loop reactor, optionally in the presence of a co-catalyst, and wherein little to no hydrogen is present in the second loop reactor. Polymerization processes in the second loop reactor can include producing a second slurry of polymer solids having a second molecular weight and comprising one or more copolymers. The second molecular weight of the polymer solids of the second slurry formed in the second loop reactor can be greater than the first molecular weight of the polymer solids of the first slurry formed in the first loop reactor. A process computer controller is used to control solids of the second reactor by balancing the recycled and recovered diluent addition and the monomer. Excess recovered diluent flow can be sent to one or more recycle towers for further purification.

In at least one embodiment, the second slurry of polymer solids is discharged into a fourth transfer conduit. The second slurry of polymer solids is referred to as a second polymerization effluent upon leaving the second loop reactor. The second polymerization effluent can be heated in the fourth transfer conduit to a temperature below the fusion temperature of the polymer solids. The heated second polymerization effluent is communicated through the fourth transfer conduit to a second flash tank (e.g., high pressure flash tank). In the second flash tank, from about 50% to about 100% of the liquid medium including the second reactor diluent is vaporized.

The vapors from the second flash tank (e.g., a high pressure flash tank) can be sent to a second separator (e.g., a cyclone). A portion of the second separator vapors can be condensed with an exchanger (e.g., CTW exchanger) into an accumulator drum. A process computer control of the pressure of the liquid accumulator and the temperature of the condenser to facilitate removal of $H_2$ and gaseous poisons ($O_2$, CO, or $CO_2$ which can be added to avoid fouling in the second flash tank and the separator). In at least one embodiment, a process computer controller is used to provide the recovered diluent and monomer to the second slurry loop reactor along with the recycled diluent, the monomer. Any excess recovered flow can be sent to one or more recycle towers for further purification.

Polymer solids are discharged from the second flash tank to a third flash tank (e.g., low pressure flash tank) through a seal chamber of sufficient dimension such as to maintain a volume of polymer solids in the seal chamber sufficient to maintain a pressure seal. The polymer solids are then communicated to a third flash tank. In the third flash tank, the polymer solids are exposed to a pressure reduction from a higher pressure in the second flash tank to a lower pressure in the third flash tank. The polymer solids are then discharged from the third flash tank to a product purge bin. In further embodiments, a flash system including at least two flash tanks is used to return diluent and unreacted monomers of the second loop reactor, and to recover any powder solids formed during the process, which are further transferred to a purge bin. Furthermore, a flash line heater can be added to the transfer line between the second and third flash drums.

In at least one embodiment, apparatuses and methods of the present disclosure provide a continuous flash drying system of the polymer solids including the second flash tank (e.g., HPFT) and the third flash tank (e.g., LPFT). The continuous flash drying system enables efficient drying of the polymer solids. The process of drying the polymer solids is achieved following a continuous removal of the polymerization effluent including the polymer solids and liquid medium comprising inert diluent and unreacted monomers from the second loop reactor through a single point discharge valve. A solids level control in the second flash tank exit seal chamber can provide a pressure seal therein which enables the second flash tank to operate under a substantially greater pressure than the third flash tank while polymer solids are continuously discharged through the seal chamber exit reducer into a fifth transfer conduit and further into the third flash tank. Such process can reduce or eliminate plugging in the second flash tank and can enable continuous liquification of from about 50% to about 100% of the inert diluent vapor by heat exchange rather than compression.

In at least one embodiment, processes and apparatuses of the present disclosure include at least two slurry loop reactors. The slurry loop reactors can be of the same volume as each other or can be different volumes. For example, for balancing polymer production, the first slurry loop reactor can be sized smaller than the second slurry loop reactor.

Bimodal polymerizations can be performed following a sequence of low molecular weight polymer production in a first loop reactor to high molecular weight polymer production in a second loop reactor, alternatively a sequence of high molecular weight polymers production in a first loop reactor to low molecular weight polymers production in a second loop reactor. In at least one embodiment, a bimodal polymerization process includes a sequence of low molecular weight polymer production in a first loop reactor to high molecular weight polymers production in a second loop reactor. In further embodiments, the second slurry of polymer solids in the second loop reactor includes a mixture of low molecular weight polymers (such as low molecular weight homopolymers) and high molecular weight polymers (such as high molecular weight copolymers). The second slurry of polymer solids may include a mixture of high molecular weight polymers (such as high molecular weight copolymers) and low molecular weight polymers (such as low molecular weight copolymers). In at least one embodiment, a polymer product can have a bimodal composition of, for example, a low molecular weight homopolymer and a high molecular weight copolymer.

In at least one embodiment, separating the first polymerization effluent includes operating the high pressure flash tank (such as the first flash tank) at a pressure of from about 75 psig to about 200 psig, such as about 90 psig to about 175 psig. The re-slurry mixer can be operated at a pressure equal to or lower than the pressure of the high pressure flash tank.

In at least one embodiment, processes and apparatuses of the present disclosure include at least two slurry loop reactors, a re-slurry mixer disposed between the at least two slurry loop reactors. Processes and apparatuses of the present disclosure can provide several advantages including: (1) providing reduced or eliminated hydrogen amounts in the second slurry loop reactor in series (2) allowing for a continuous processing of the contents of a slurry reactor from the point of discharge of the polymerization slurry effluent through a discharge valve; a first flash tank and a second flash tank; a seal chamber; a seal chamber exit reducer; and therefrom to a re-slurry mixture or a third flash tank, (3) significantly increasing ethylene concentration in the loop reactor liquid medium thereby increasing reactor throughput, (4) significantly increasing the wt % of polymer solids in the polymerization slurry, (5) significantly increasing reactor space time yield, and/or (6) energy consumption is reduced by reducing the need to compress and/or distill the reactor vapor-liquid effluent. Recycling, compressors and other downstream equipment can be reduced in size or eliminated.

Olefin monomers for use in processes of the present disclosure may include $C_2$-$C_8$ alpha-olefins. For example, non-limiting examples of monomers include $C_2$ (ethylene) monomer and comonomers can include $C_4$-$C_8$ alpha-olefin comonomers may include butene, pentene, hexene and octene.

Suitable diluents employed in such olefin polymerizations include $C_3$-$C_5$ saturated aliphatic hydrocarbons, such as $C_3$-$C_5$ saturated aliphatic hydrocarbons, such as $C_3$-$C_4$ saturated aliphatic hydrocarbons, such as propane, isobutane, n-butane, n-pentane, isopentane, or a combination thereof. In at least one embodiment, the diluent is isobutane. For example, the first reactor diluent, the re-slurry mixer diluent, and the second reactor diluent of the present disclosure can be the same, or different. Furthermore, excess recovered diluent from both the first and second reactor can be diverted to the recycle towers to be treated/purified, and then recycled back as recycle diluent to re-slurry mixer, reactor feed, catalyst and pump flushes that require low levels of monomer and other components. For efficiency, it is preferable to maximize the return of the recovered diluent from the flash drums to the feed of the reactor from which it came. Process computer control is utilized to balance these flows to maintain the reactor pressure and solids concentration.

In at least one embodiment, processes for preparing polymers in the first loop reactor include introducing a catalyst to the first loop reactor. The catalyst can be independently selected from a Ziegler-Natta catalyst, a metallocene or single site catalyst, a chrome oxide catalyst, and combination(s) thereof. Processes for preparing polymers of the present disclosure may further include introducing a co-catalyst to the first loop reactor and/or the second loop reactor. The co-catalyst can be independently selected from a trialkylaluminum, such as trimethylaluminum, triethylaluminum, triisobutylaluminum, tri-n-hexylaluminum, tri-n-octylaluminum, tripropylaluminum, or tributylaluminum. Processes for preparing polymers may further include introducing a reversible poison, such as carbon monoxide, to the effluent of first loop reactor and/or second loop reactor.

Processes for preparing polymers in the second loop reactor may further include co-catalyst. Also, a catalyst poison such as oxygen ($O_2$), carbon monoxide (CO), or carbon dioxide ($CO_2$) can be introduced to the effluent of the second loop reactor.

The rate of discharge of the polymerization effluent is such as to allow a continuous process stream from the slurry loop reactor from the point of discharge of the liquified polymerization effluent through a single point discharge valve, through the flash tank (e.g., a HPFT), and also through the re-slurry mixer, and the associated vapor recovery and solids recovery systems. The rate of discharge of the polymerization effluent is such as to maintain a constant pressure in the slurry loop reactor and to eliminate intermittent high pressure pulses associated with a discharge of a portion of the reactor contents that occurs with settling legs on slurry reactors.

The temperature to which the first polymerization effluent which is discharged from the first loop reactor may be heated during transit to the first flash tank (e.g., first HPFT) for vaporization if below the fusion temperature of the polymer. When heating of the first transfer conduit in fluid communication with the first loop reactor and the first flash tank, the quantity of heat to be supplied to the first polymerization effluent during its transit through the first conduit to the first flash tank should be at least equal to that quantity of heat which equals the heat of vaporization of the quantity of inert diluent which is to be flash vaporized in the first flash tank. Thus, in embodiments including in-line heating, the concentrated polymer solids formed in the first flash tank can be passed to the re-slurry mixer to pass thereto at a higher solids temperature and thus facilitates the removal of residual diluent and/or hydrogen in the pores of such polymer solids. The quantity of heat transferred to the first polymerization effluent during its transit through the first transfer conduit to the first flash tank may even be greater, provided that the quantity of heat so transferred will not cause the polymer solids therein to become heated to such a temperature at which they will tend to fuse or agglomerate one with another.

The temperature to which the second polymerization effluent is discharged from the second loop reactor (and is heated during transit to the second flash tank (e.g., second HPFT) for vaporization) is below the fusion temperature of the polymer. Heating may be accomplished by appropriate heating of the fourth transfer conduit in fluid communication with the second loop reactor and the second flash tank. The quantity of heat to be supplied to the second polymerization effluent during its transit through the fourth conduit to the second flash tank should be at least equal to the quantity of heat which equals the heat of vaporization of the quantity of inert diluent which is to be flash vaporized in the second flash tank. Thus, in embodiments including in-line heating, the concentrated polymer solids formed in the second flash tank can be passed to the third flash tank (e.g., LPFT) to pass thereto at a higher solids temperature and thus facilitates the removal of residual diluent in the pores of such polymer solids by the operation of the third flash tank. Alternately, the third flash tank can be replaced by a low pressure purge column.

In at least one embodiment, the first concentrated polymer solids/slurry are discharged from the first flash tank exit seal chamber of such a length (l) and diameter (d) so as to provide a volume sufficient to maintain a volume of first concentrated polymer solids/slurry sufficient to maintain a pressure seal in the exit seal chamber. The first concentrated polymer solids/slurry are discharged from the exit seal chamber through an exit seal chamber reducer to a second transfer conduit which communicates the first concentrated polymer solids/slurry as a plug flow to a re-slurry mixer. The exit seal chamber reducer is defined by substantially straight sides inclined at an angle to that of horizontal equal to or greater than the angle of slide of the first concentrated polymer solids/slurry.

A second concentrated polymer slurry including the first concentrated polymer solids/slurry and diluent is further formed in the re-slurry mixer. The re-slurry mixer can operate at a temperature of from about 20° C. to about 100° C., such as from about 25° C. to about 75° C., such as from about 30° C. to about 50° C. Furthermore, the re-slurry mixer can operate at a pressure of from about 80 psig to about 175 psig, such as from about 85 psig to about 105 psig. The residence time in the re-slurry mixer can be of about 1 minute to about 30 minutes, such as from about 2 minutes to about 15 minutes. The re-slurry mixer can include a powered agitator to mix/blend the polymer slurry at a speed of from about 50 rpm to about 1,200 rpm, such as from about 100 rpm to about 1,000 rpm, such as 240 rpm. The second concentrated polymer slurry is discharged from the re-slurry mixer and introduced to the second loop reactor via a third conduit via a pump. A second polymer solids/slurry is formed in the second loop reactor.

The second polymer solids/slurry is discharged from the second reactor into a second flash tank through a fourth transfer conduit. The second concentrated polymer slurry is discharged from the second flash tank (e.g., HPFT) via an exit seal chamber which has a length (l) and diameter (d) so as to provide a volume sufficient to maintain a volume of polymer solids/slurry sufficient to maintain a pressure seal in the exit seal chamber. The second concentrated polymer solids/slurry is discharged from the exit seal chamber through an exit seal chamber reducer to a fifth transfer conduit which communicates the second concentrated polymer slurry as a plug flow to a third flash tank (e.g., LPFT). The exit seal chamber reducer is defined by substantially straight sides inclined at an angle to that of horizontal equal to or greater than the angle of slide of the concentrated polymer solids/slurry.

The pressure for the first flash process (e.g., first HPFT) and the second flash process (e.g., second HPFT) may vary depending on the nature of the diluent and unreacted monomers and the temperature of the polymerization effluent. The pressure for the first flash process and/or second flash process can be independently from about 75 psig to about 250 psig, such as about 75 psig to about 200 psig, alternatively about 90 psig to about 250 psig, such as from about 100 psig to about 225 psig, such as from about 125 psig to about 200 psig, such as from about 150 psig to about 175 psig. In at least one embodiment, separating the polymerization effluent includes operating the first flash tank and/or the second flash tank at a pressure of from about 90 psig to about 175 psig. The pressure for the third flash process (e.g., LPFT) can be from about 0.05 psig to about 50 psig, such as about 10 psig to about 40 psig, such as about 15 psig to about 35 psig, such as about 20 psig.

The heat exchanging fluid used to condense the vapor from the first flash process (e.g., first HPFT) and the second flash process (e.g., second HPFT) is at a temperature independently from about 18° C. to about 70° C., such as from about 23° C. to about 60° C., such as from about 30° C. to about 55° C. The heat exchanging fluid used to condense the vapor from the third flash process (e.g., LPFT) is at a temperature from about 18° C. to about 70° C., such as from about 23° C. to about 60° C., such as from about 30° C. to about 55° C.

In at least one embodiment, the first slurry of polymer solids formed in the first loop reactor may include a polymer having one or more of: a GPC molecular weight distribution with a Mw value of from about 10,000 g/mol to about 100,000 g/mol, Mn value of about 3,000 g/mol to about 30,000 g/mol, Mz value of from about 20,000 to about 200,000, and PDI of from about 2 to about 8 and a density of from about 0.930 g/cm$^3$ to about 0.980 g/cm$^3$.

The second slurry of polymer solids formed in the second loop reactor may include a polymer having one or more of: a GPC molecular weight distribution with a Mw value of from about 100,000 g/mol to about 1,000,000 g/mol, Mn value of from about 30,000 g/mol to about 300,000 g/mol, Mz value of from about 200,000 to about 4,000,000, and PDI of from about 2.0 to about 8.0, and a density of from about 0.900 g/cm$^3$ to about 0.930 g/cm$^3$.

The second reactor effluent can include a bimodal polymer product. For example, a second reactor effluent can include a polymer product having a GPC molecular weight distribution with a Mw value of from 50,000 g/mol to about 1,000,000 g/mol, Mn value of from 3,000 g/mol to about 50,000 g/mol, Mz value of from about 400,000 to about 4,000,000, and PDI of from 8.0 to 80.0, and a density of from about 0.930 g/cm$^3$ to about 0.965 g/cm$^3$.

Examples of Configurations for Bimodal Slurry Polymerization

Figure 1B:
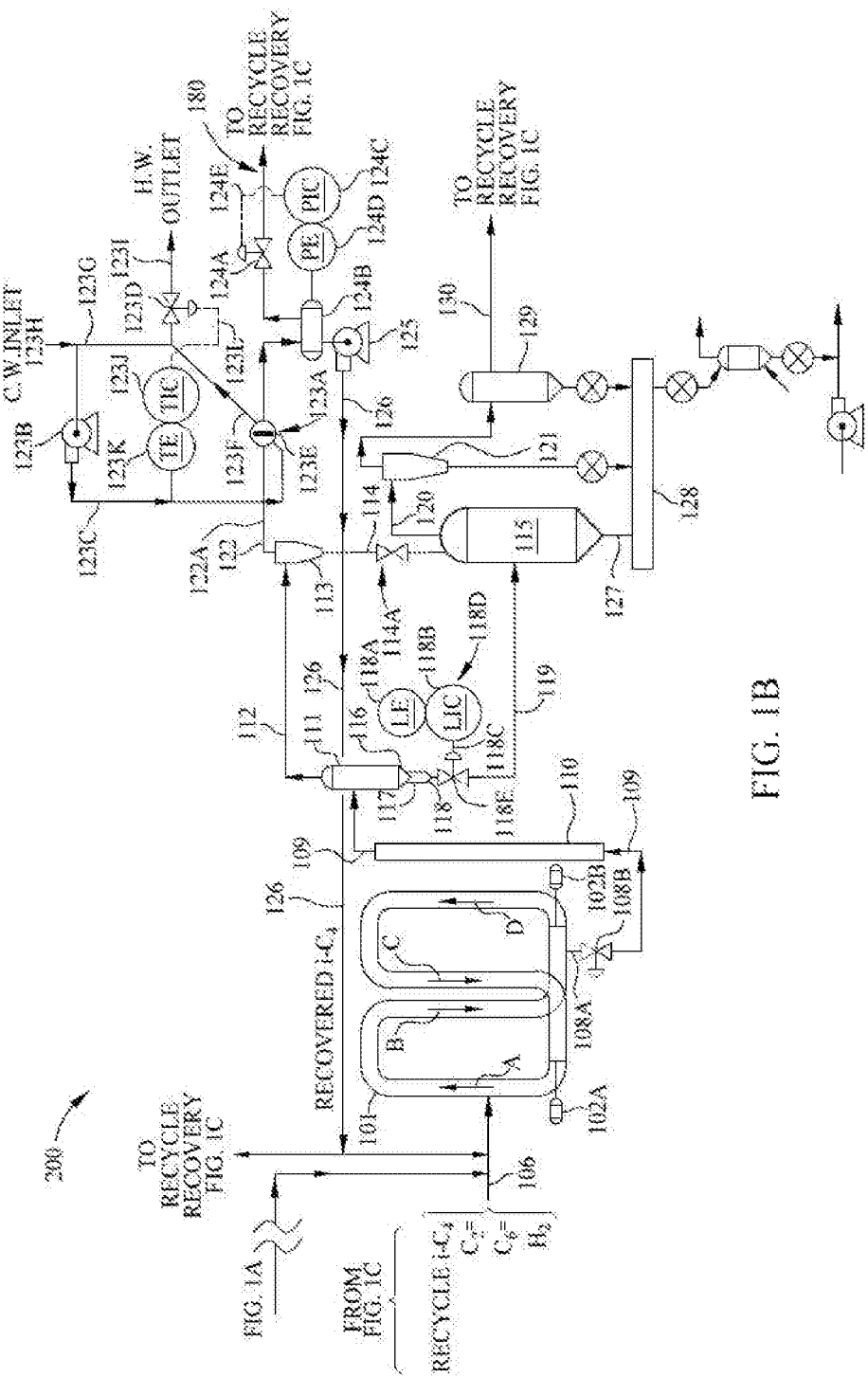
FIG. 1B is a diagram illustrating an apparatus for forming bimodal polymers, according to an embodiment.

A further understanding of the present disclosure will be provided by referring to FIGS. 1A and 1B which illustrate a system comprising an embodiment of the present disclosure.

FIG. 1A is a diagram of an apparatus 100. In the embodiment illustrated in FIG. 1A, apparatus 100 has a loop reactor 1 configured to perform polymerization. It will be understood that while the loop reactor 1 is illustrated with four vertical legs, the loop reactor 1 may be equipped with more legs, such as eight or more legs, such as between 8 and 20, such as between 8 and 16, such as with 12 legs. The polymerization slurry is directionally circulated throughout the loop reactor 1 as illustrated by arrows A-D by one or more pumps, such as axial flow pumps, 2A and 2B. In at least one embodiment, the loop reactor 1 is equipped with multiple pumps. Diluent, monomer, and/or comonomer, are introduced into the loop reactor 1 via conduit 6. The catalyst is added to the loop reactor 1 through one or more catalyst feed systems 7A and 7B. The catalyst can be introduced in a hydrocarbon diluent. In at least one embodiment, a monomer, a first reactor diluent, a catalyst, hydrogen, and optional comonomer are introduced to the loop reactor 1 to produce, under polymerization conditions, a first slurry of polymer solids including polymers having a molecular weight. Hydrogen is introduced in the loop reactor 1 at a first hydrogen concentration. The introduction of the monomer to the first reactor diluent, the catalyst, hydrogen, and optional comonomer can be performed at a temperature of from about 50° C. to about 150° C., such as about 50° C. to about 120° C., and/or a pressure of from about 200 psig to about 1000 psig, such as about 200 psig to about 800 psig.

Polymerization slurry may be removed from the loop reactor 1 by continuous discharge through a discharge conduit 8A. It will be understood that the loop reactor 1 may be equipped with one or more discharge conduits 8A. It will be also understood that the discharge conduit(s) 8A may be operated in a continuous or discontinuous mode, such as a continuous mode. The discharge conduit 8A extends for a distance through a portion of the wall of the loop reactor 1 and into the circulating polymerization slurry. By extending for a distance into the polymerization slurry, the discharge conduit 8A may remove polymerization effluent from the circulating polymerization slurry over an area defined from near or adjacent the inside wall of the loop reactor 1 to a distance extending into the circulating polymerization slurry. Accordingly, a higher weight percentage of polymer solids may be formed within the conduit 8A and ultimately removed from the loop reactor 1 than the weight percentage of polymer solids within the otherwise circulating polymerization slurry. A pressure control system 410 (shown in FIG. 4) operates in concert with the discharge conduit 8A. The discharge conduit 8A and the pressure control system 410 are more clearly illustrated in FIGS. 3 and 4 and will be discussed in greater detail below.

The polymerization effluent passes from the discharge conduit 8A to the discharge valve 8B to a conduit 9 which is provided with a line heater 10 and into the first flash tank 11 (e.g., first HPFT) which separates vaporized liquid medium from polymer slurry/solids. Conduit 9 has an indirect heat exchange means such as a flash line heater 10. In at least one embodiment, the first polymerization effluent is separated in the first flash tank 11 to vaporize from about 50% to about 100% of the first reactor diluent and provide a flash vapor including the first reactor diluent and unreacted monomer, and to provide a first concentrated polymer slurry. In further embodiments, hydrogen is present in the first concentrated polymer slurry exiting the first flash tank 11 at a second hydrogen concentration that is lower than the first hydrogen concentration. In at least one embodiment, the first hydrogen concentration is greater than the second hydrogen concentration. In further embodiments, little to no hydrogen is present in the first concentrated polymer slurry that is transferred from the first flash tank 11.

Vaporized liquid medium comprising diluent and unreacted monomers, hydrogen and other non-condensable gases like CO, $O_2$, $CO_2$ exit the first flash tank 11 via transfer conduit 12 through which it is passed into a separator 13 (e.g., a cyclone), which separates entrained polymer solids from the vapor. Polymer solids separated by the separator 13 are passed via conduit 14 through a control valve 14A designed to maintain a pressure seal below separator 13 to a re-slurry mixer 15.

Figure 1C:
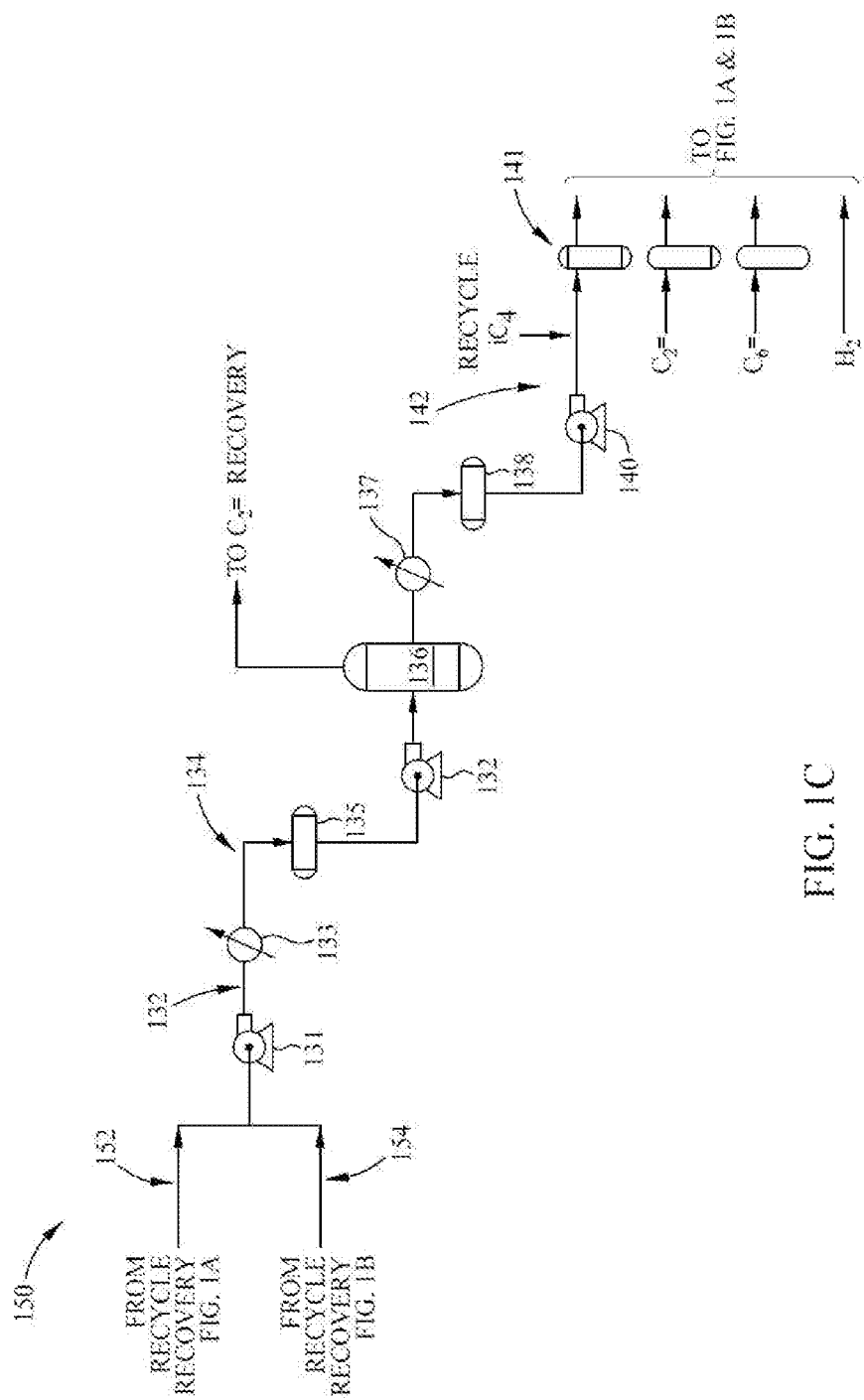
FIG. 1C is a diagram illustrating a recycle recovery unit, according to an embodiment.
Figure 2:
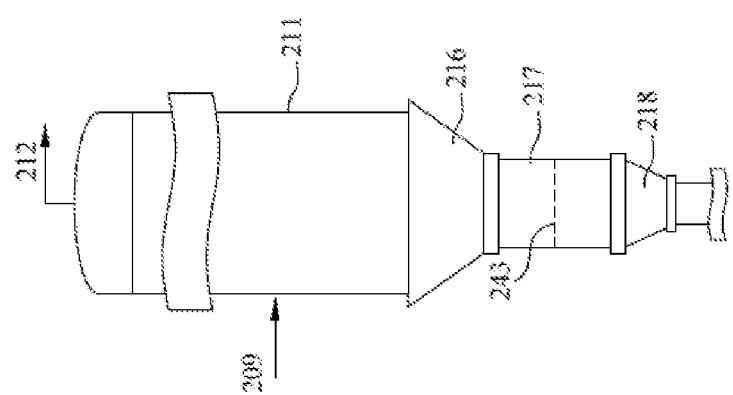
FIG. 2 is a diagram illustrating a flash tank, according to an embodiment.

Referring back to the first flash tank 11, the concentrated polymer solids/slurry in the bottom of the first flash tank 11 continuously settles by sliding along the straight line bottom surface 16 thereof into the seal chamber 17 which is illustrated in enlargement FIG. 2 (where bottom surface 16 is illustrated as bottom surface 216; transfer conduit 12 is illustrated as transfer conduit 212; conduit 9 of FIG. 1 is illustrated as conduit 209; and seal chamber exit reducer 18 of FIG. 1 is illustrated as seal chamber exit reducer 218 in FIG. 2). As shown in FIG. 2, a polymer solids/slurry level 243 is maintained in the seal chamber 217 to eliminate plugging tendencies in first flash tank 211 (which can be first flash tank 11 of FIG. 1) and to form a pressure seal so that the first flash tank 211 can operate at a equal to or higher pressure than the re-slurry mixer 15. Note also that transfer conduit 212 through which gases exit the flash tank 211 can be the transfer conduit 12 of FIG. 1; likewise, 209, 216 and 218 of FIG. 2 can correspond to Returning to FIGS. 1A and 1B, the first concentrated polymer slurry is transferred from the seal chamber 17 to a re-slurry mixer 15. Recycle diluent (of 141 (FIG. 1C)) can be introduced to the first concentrated polymer slurry (e.g., from a recycle diluent treater) to form a second concentrated polymer slurry in the re-slurry mixer 15, and further discharging the second concentrated polymer slurry from the re-slurry mixer 15 into a second loop reactor (as shown in FIG. 1B) via a pump 92. Additionally or alternatively, a second diluent can be introduced to the first concentrated polymer slurry from a diluent source 190. Control of the re-slurry mixer diluent flow into the reslurry mixer can be adjusted as required to maintain a pumpable slurry. In addition, the reslurry mixer pressure is controlled by venting via conduit 90A to the recycle recovery unit of FIG. 1C, as described in more detail below.

In the embodiment illustrated in FIG. 1A, polymer slurry/solids are continuously discharged from the seal chamber 17 into the re-slurry mixer 15. The length (l), diameter (d), and volume of the seal chamber 17 and the geometry of the seal chamber exit reducer 18 are chosen so as to provide a variable residence time and provide a continuous plug flow of concentrated polymer solids/slurry to minimize "dead" space and reduce plugging tendencies. The seal chamber 17 length should be sufficient to allow particle (polymer solids) level measurement and control.

Particle level measurement and control may be accomplished by a nuclear level indicating system 18D. The nuclear level indicating system 18D includes a nuclear radiating source (not shown) and receiver or level element 18A in signal communication with a level indicating controller 18B. In operation, the level element 18A generates a signal proportional to the particulate level in the seal chamber 17. The signal is conveyed to the level indicating controller 18B. In response to the signal and a preset value, the level indicating controller 18B sends a signal through a conduit (illustrated by broken line 18C) to a control valve 18E which selectively controls the discharge of polymer solids into a conduit 19.

Residence times of the concentrated polymer solid/slurry in the seal chamber 17 can be from about 5 seconds to about 10 minutes, such as from about 10 seconds to about 2 minutes, such as from about 15 seconds to about 45 seconds. The continuous plug flow of concentrated polymer solids/slurry forms a pressure seal wherein the concentrated polymer solids/slurry have an l/d ratio inside the seal chamber 17. The l/d ratio can be of about 1.5 to about 8, such as about 2 to about 6, such as about 2.2 to about 3. The seal chamber exit reducer 18 sides can be inclined, relative to the horizontal, 60 degrees-85 degrees, such as 65 degrees-80 degrees, such as 68 degrees-75 degrees. The seal chamber exit reducer 18 geometry is defined by substantially straight sides inclined at an angle to that of horizontal equal to or greater than the angle of slide of the concentrated polymer slurry/solids and communicates the concentrated polymer solid/slurry to a second transfer conduit 19 which communicates with a feed inlet of the re-slurry mixer 15. A pump can be provided for conveying the polymer slurry from the re-slurry mixer 15 to the second loop reactor. The pressure of the re-slurry mixer 15 can be maintained at equal to or less than the pressure of the first flash tank 11. The re-slurry mixer 15 is vented to the recycle system (via conduit 90A) for pressure control.

Referring now to the separator 13, the major portion of the liquid medium in the polymerization effluent may be been taken to separator 13 as vapor where the larger polymer solids/catalyst particles are removed. The vapor after having a portion of the entrained catalyst and polymer solids removed is passed via conduit 22 through a heat exchanger system 23A where the vapor at a pressure from about 75 psig to about 250 psig is condensed by indirect heat exchange with a heat exchange fluid such as to eliminate the need for compression. The portion of the entrained catalyst and polymer solids not removed by the separator 13 are substantially smaller in size and may be referred to as "fines". These fines may include unreacted and/or under-reacted catalyst.

The heat exchanger system 23A includes a heat exchanger 23E and a tempered water circulating pump 23B connected to the heat exchanger 23E by conduit 23C. A tempered water temperature control valve 23D is connected to the heat exchanger 23E and water circulating pump 23B by conduits 23F and 23G, respectively. Cooling water from a cooling water source (not shown) is conveyed via a cooling water conduit 23H into the conduit 23G between the control valve 23D and the circulating pump 23B. A temperature indicating controller (TIC) 23J is connected between the control valve 23D and the conduit 23C. Between the controller 23J and the conduit 23C resides a temperature element 23K.

The heat exchanger system 23A operates to control the amount of vapor condensed in the heat exchanger 23E. The control can be accomplished by controlling the flow of cooling water introduced into the conduit 23G from the conduit 23H by exhausting heated water formed in the heat exchanger 23E. The heated water from the heat exchanger 23E is conveyed to the control valve 23D via the conduit 23F. The heated water exits the control valve 23D via the conduit 23I.

Furthermore, a cooling water from the conduit 23H entering the conduit 23G mixes with a circulating tempered water in the conduit 23G, the mixture thereof enters the pump 23B. The water exiting the pump 23B enters the conduit 23C, a portion of which contacts the temperature element 23K, in route to the heat exchanger 23E. The temperature element 23K generates a signal proportional to the temperature in conduit 23C. The signal is conveyed to the temperature indicating controller 23J. In response to the signal and a preset temperature value, the temperature indicating controller 23J sends a signal through a signal conduit (illustrated by the broken line 23L) to the control valve 23D which selectively controls the volume of heated water exiting the heat exchanger system 24A through the conduit 23I.

The condensed liquid medium formed at the heat exchanger 23E includes diluent, unreacted/under-reacted catalyst, polymer solids, and unreacted monomers. The condensed liquid medium is then passed to an accumulator 24B via a conduit 22A.

Purging of the catalyst poison kill agent that was added to the first reactor effluent is accomplished by the vapor purge rate from the accumulator. This can be accomplished by measuring the concentration of the catalyst poison in the purge stream. This can also be accomplished by monitoring the reactor catalyst activity. The amount of vapor condensed in the heat exchanger 23E is controlled and sufficient vapor pressure in the accumulator 24B is maintained. Thus, a pressure control valve 24A can maintain sufficient back pressure on the accumulator 24B. By maintaining a sufficient back pressure on the accumulator 24B, a proper operating pressure is maintained in the first flash tank 11. The pressure control valve 24A is actuated by a pressure indicating controller 24C in concert with a pressure element 24D. The pressure element 24D is in sensing communication with the accumulator 24B. The pressure element 24D generates a signal proportional to the pressure in the accumulator 24B. In response to the signal and a preset pressure value, the pressure indicating controller 24C sends a signal through a signal conduit (illustrated by the broken line 24E) to the control valve 24A which selectively controls the back pressure on the accumulator 24B.

A pump 25 is provided for conveying the condensed liquid medium from the accumulator 24B back to the polymerization zone by a conduit 26. Thus, the unreacted/under-reacted catalyst and polymer solids not removed by the separator 13 are returned for further polymerization to the loop reactor 1 or sent via conduit 26 to recycle recovery unit of FIG. 1C, as described in more detail below.

In at least one embodiment, the second concentrated polymer slurry formed in the re-slurry mixer 15 is transferred via pump 92 from the re-slurry mixer 15 to a second loop reactor 101 (FIG. 1B) for further processing.

In the embodiment illustrated in FIG. 1B, a second polymerization process is carried out in a second loop reactor 101. Additional monomer and comonomer are introduced to the second loop reactor in a second reactor diluent (combination of second reactor recovered diluent and recycled diluent) to produce, under polymerization conditions, a second slurry of polymer including copolymers having a second molecular weight. The second slurry of polymer solids has a third hydrogen concentration, which is significantly lower than the first hydrogen concentration.

It will be understood that while the second loop reactor 101 is illustrated with four vertical legs, the second loop reactor 101 may be equipped with more legs, such as eight or more legs, such as between 8 and 20, such as between 8 and 16, such as with 12 legs. The polymerization slurry is directionally circulated throughout the second loop reactor 101 as illustrated by arrows A-D by one or more pumps, such as axial flow pumps, 2A and 2B. In at least one embodiment, the second loop reactor 101 is equipped with multiple pumps.

Diluent (both recovered from reactor 101 and recycled diluent), comonomer and monomer are introduced into the second loop reactor 101 via conduit 106.

A co-catalyst can be added directly to the second loop reactor 101. The co-catalyst can be introduced in a hydrocarbon diluent. In at least one embodiment, the second reactor diluent is a $C_3$-$C_5$ saturated aliphatic hydrocarbon (e.g., isobutane). In further embodiments, the first hydrogen concentration is greater than the second hydrogen concentration, such as little to no hydrogen is present in the loop reactor 101.

Computer control of residence time and solids concentration in the second loop is used to achieve the balance of the first reactor solids with the second reactor solids for the bimodal product.

Polymerization slurry may be removed from the second loop reactor 101 by continuous discharge through a discharge conduit 108A. It will be understood that the second loop reactor 101 may be equipped with one or more discharge conduits 108A. It will be also understood that the discharge conduit(s) 108A may be operated in a continuous or discontinuous mode, such as a continuous mode. The discharge conduit 108A extends for a distance through a portion of the wall of the second loop reactor 101 and into the circulating polymerization slurry. By extending for a distance into the polymerization slurry, the discharge conduit 108A may remove polymerization effluent from the circulating polymerization slurry over an area defined from near or adjacent the inside wall of the second loop reactor 101 to a distance extending into the circulating polymerization slurry. Thus, a higher weight percentage of polymer solids may be formed within the conduit 108A and ultimately removed from the second loop reactor 101 than the weight percentage of polymer solids within the otherwise circulating polymerization slurry. A pressure control system (not shown in FIG. 1B), same as the pressure control 410 described in FIG. 1A, operates in concert with the discharge conduit 108A.

The polymerization effluent passes from the discharge conduit 108A to the discharge valve 108B to a conduit 109 which is provided with a line heater 110 and into the second flash tank 111 (e.g., second HPFT) which separates vaporized liquid medium from polymer slurry/solids. Conduit 109 has an indirect heat exchange means such as a flash line heater 110. A catalyst poison is added which can include $O_2$, $CO_2$, and CO, as described in U.S. Pat. No. 9,637,570, incorporated by reference herein for that description.

Vaporized liquid medium comprising diluent and unreacted monomers, hydrogen and other non-condensables exit the second flash tank 111 via transfer conduit 112 through which it is passed into a separator 113, such as a cyclone, which separates entrained polymer solids from the vapor. Polymer solids separated by the separator 113 are passed via conduit 114 through a control valve 114A designed to maintain a pressure seal below separator 113 to a lower pressure third flash tank 115 (e.g., LPFT). In at least one embodiment, the third flash tank 115 (e.g., LPFT) is operated at a pressure of from about 0.05 psig to about 50 psig, such as at about 20 psig.

Referring back to the second flash tank 111, the concentrated polymer solids/slurry in the bottom of the second flash tank 111 continuously settles by sliding along the straight line bottom surface 116 thereof into the seal chamber 117 (same as the seal chamber 17, which is illustrated in enlargement FIG. 2). A polymer solids/slurry level is maintained in the seal chamber 117 to eliminate plugging tendencies in second flash tank 111 and to form a pressure seal so that the second flash tank 111 can operate at a substantially higher pressure than the third flash tank 115. Polymer slurry/solids are continuously discharged from the seal chamber 117 into the lower pressure third flash tank 115. The length (l), diameter (d), and volume of the seal chamber 117 and the geometry of the seal chamber exit reducer 118 are chosen so as to provide a variable residence time and provide a continuous plug flow of concentrated polymer solids/slurry to minimize "dead" space and reduce plugging tendencies. The seal chamber 117 length should be sufficient to allow particle (polymer solids) level measurement and control.

Particle level measurement and control may be accomplished by a nuclear level indicating system 118D. The nuclear level indicating system 118D includes a nuclear radiating source (not shown) and receiver or level element 118A in signal communication with a level indicating controller 181B. In operation, the level element 118A generates a signal proportional to the particulate level in the seal chamber 117. The signal is conveyed to the level indicating controller 118B. In response to the signal and a preset value, the level indicating controller 118B sends a signal through a conduit (illustrated by broken line 118C) to a control valve 118E which selectively controls the discharge of polymer solids into a conduit 119.

Suitable residence times of the concentrated polymer solid/slurry in the seal chamber 117 are from about 5 seconds to about 10 minutes, such as from about 10 seconds to about 2 minutes, such as from about 15 seconds to about 45 seconds. The continuous plug flow of concentrated polymer solids/slurry forms a pressure seal wherein the concentrated polymer solids/slurry have an l/d ratio inside the seal chamber 117 which is about 1.5 to about 8, such as about 2 to about 6, such as about 2.2 to about 3. The seal chamber exit reducer 118 sides are inclined, relative to the horizontal, 60 degrees-85 degrees, such as 65 degrees-80 degrees, such as 68 degrees-75 degrees. The seal chamber exit reducer 118 geometry is defined by substantially straight sides inclined at an angle to that of horizontal equal to or greater than the angle of slide of the concentrated polymer slurry/solids and communicates the concentrated polymer solid/slurry to a second transfer conduit 119 which communicates with a feed inlet of the third flash tank 115. In the third flash tank 115, substantially all of any remaining inert diluent and unreacted monomer in the concentrated polymerization effluent is vaporized and taken overhead via conduit 120 to a secondary separator 121.

Referring now to the separator 113, the major portion of the liquid medium in the polymerization effluent may be been taken to separator 113 as vapor where the larger polymer solids/catalyst particles are removed. The vapor after having a portion of the entrained catalyst and polymer solids removed is passed via conduit 122 through a heat exchanger system 123A wherein the vapor at a pressure from about 75 psig to about 250 psig is condensed by indirect heat exchange with a heat exchange fluid such as to eliminate the need for compression. The portion of the entrained catalyst and polymer solids not removed by the separator 113 are smaller in size and may be referred to as "fines". These fines may include unreacted and/or under-reacted catalyst.

The heat exchanger system 123A includes a heat exchanger 123E and a tempered water circulating pump 123B connected to the heat exchanger 123E by conduit 123C. A tempered water temperature control valve 123D is connected to the heat exchanger 123E and water circulating pump 123B by conduits 123F and 123G, respectively. Cooling water from a cooling water source (not shown) is conveyed via a cooling water conduit 123H into the conduit 123G between the control valve 123D and the circulating pump 123B. A temperature indicating controller (TIC) 123J is connected between the control valve 123D and the conduit 123C. Between the controller 123J and the conduit 123C resides a temperature element 123K.

The heat exchanger system 123A operates to control the amount of vapor condensed in the heat exchanger 123E. The control can be accomplished by controlling the flow of cooling water introduced into the conduit 123G from the conduit 123H by exhausting heated water formed in the heat exchanger 123E. The heated water from the heat exchanger 123E is conveyed to the control valve 123D via the conduit 123F. The heated water exits the control valve 123D via the conduit 123I.

Furthermore, cooling water from the conduit 123H entering the conduit 123G mixes with circulating tempered water in the conduit 123G, the mixture thereof enters the pump 123B. The water exiting the pump 123B enters the conduit 123C, a portion of which contacts the temperature element 123K, in route to the heat exchanger 123E. The temperature element 123K generates a signal proportional to the temperature in conduit 123C. The signal is conveyed to the temperature indicating controller 123J. In response to the signal and a preset temperature value, the temperature indicating controller 123J sends a signal through a signal conduit (illustrated by the broken line 123L) to the control valve 123D which selectively controls the volume of heated water exiting the heat exchanger system 124A through the conduit 123I.

The condensed liquid medium formed at the heat exchanger 123E includes diluent, unreacted/under-reacted catalyst, polymer solids and unreacted monomers. The condensed liquid medium is then passed to an accumulator 124B via a conduit 122A.

Purging of the catalyst poison kill agent (e.g., CO, $CO_2$, or $O_2$) that was added to the second reactor effluent is accomplished by the vapor purge rate from the accumulator 124B. This can be accomplished by measuring the concentration of the catalyst poison in the purge stream. This can also be accomplished by monitoring the reactor catalyst activity. The amount of vapor condensed in the heat exchanger 123E is controlled and sufficient vapor pressure in the accumulator 124B is maintained. Thus, a pressure control valve 124A can maintain sufficient back pressure on the accumulator 124B. By maintaining a sufficient back pressure on the accumulator 124B, a proper operating pressure is maintained in the second flash tank 111. The pressure control valve 124A is actuated by a pressure indicating controller 124C in concert with a pressure element 124D. The pressure element 124D is in sensing communication with the accumulator 124B. The pressure element 124D generates a signal proportional to the pressure in the accumulator 124B. In response to the signal and a preset pressure value, the pressure indicating controller 124C sends a signal through a signal conduit (illustrated by the broken line 124E) to the control valve 124A which selectively controls the back pressure on the accumulator 124B. An accumulator effluent of accumulator 124B can be transferred via conduit 180 to recycle recovery unit of FIG. 1C, as described in more detail below.

A pump 125 is provided for conveying the condensed liquid medium from the accumulator 124B back to the polymerization zone or to the recycle recovery unit (of FIG. 1C) by a conduit 126. Thus, the unreacted/under-reacted catalyst and polymer solids not removed by the cyclone 113 are returned for further polymerization to the second loop reactor 101, providing control of the use of recovered diluent versus the recycled diluent.

The polymer solids in the lower pressure third flash tank 115 are passed via a conduit 127 to a conventional dryer 128. The vapor exiting the secondary separator 121, after filtration in a filter unit 129, is passed by a conduit 130 to the recycle recovery unit (of FIG. 1C).

FIG. 1C illustrates a recycle recovery unit 150. Recycle recovery unit 150 includes feed line 152 and feed line 154. Feed line 152 includes one or more of the contents of conduits 26, 90A, or 90 B of FIG. 1A. Feed line 154 includes one or more of the contents of conduits 126, 130, or 180 of FIG. 1B. Recycle recovery unit 150 further includes a compressor 131 and the compressed vapors are passed through a conduit 132 to a condenser 133 where vapor is condensed. The condensate is passed through conduit 134 to storage vessel 135. The condensed liquid medium in the storage vessel 135 can be vented overhead for removal of light-end contaminants. The inert diluent can be distilled in unit 136 for complete removal of light-ends and then a vapor side draw of degassed isobutane is condensed by heat exchanger 137 and stored in vessel 138. The recycled isobutane can then be pumped via a pump 140 through conduit 142 to treater 141 to conduits to the first reactor 1 and to the re-slurry mixer (of FIG. 1A) and to the second reactor 101 (of FIG. 1B).

Figure 3:
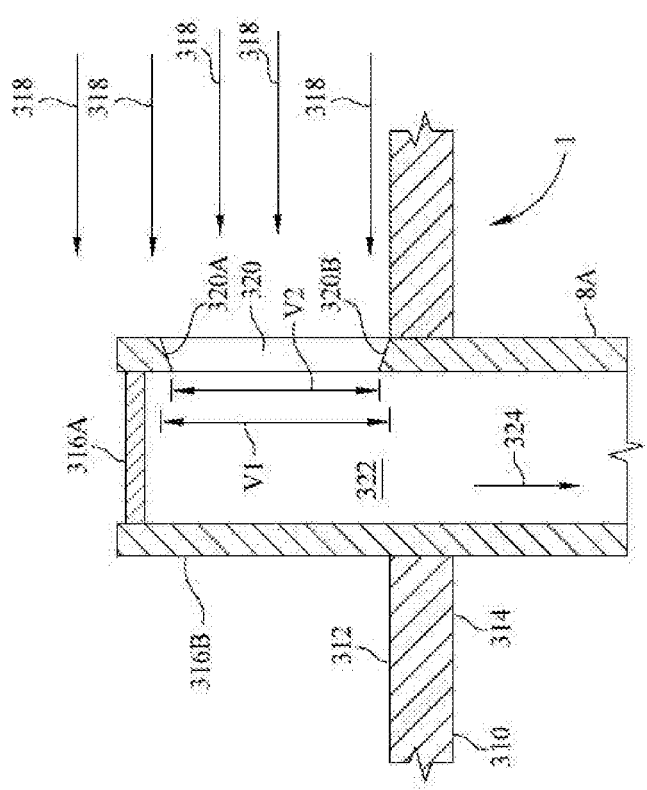
FIG. 3 is an enlarged, cross sectional view of the discharge conduit with opening extending a distance into the loop reactor and the circulating polymerization slurry, according to an embodiment.

FIG. 3 is an enlarged, cross sectional view of the discharge conduit with opening extending a distance into the loop reactor and the circulating polymerization slurry. A portion of a wall 310 of the loop reactor 1 through which the discharge conduit 8A extends is illustrated. The discharge conduit 8A may extend into the reactor at various angles. In at least one embodiment, the discharge conduit 8A extends into the loop reactor at substantially a right angle relative to the wall 310.

The wall 310 includes an inside surface 312 and an outside surface 314. The inside surface 312 supports the circulating polymerization slurry illustrated by directional arrows 318. The discharge conduit 8A has a top 316A, and a continuous side 316B. Portions of the side 316B define an opening 320. The opening 320 has a vertical opening dimensions v1 and v2 defined by walls 320A and 320B of the side 316B. In at least one embodiment, the v1 dimension is greater than the v2 dimension. The opening 320 has horizontal opening dimensions h1 and h2 (not shown). The opening 320 may be formed in any suitable shape, such as rectangular, oval, or a combination thereof. In one embodiment, the opening 320 may be conical-shaped or scooped shaped.

The opening 320 communicates with a channel 322 defined by the inside surfaces of the top 316A and the side 316B. The channel 322 conveys captured polymerization slurry, illustrated by directional arrow 324 to the discharge valve 8B (not shown).

The opening 320 is sized and positioned relative to the direction of movement of the circulating polymerization slurry 318. In at least one embodiment, the opening 320 is in a substantially facing position to the direction of the circulating polymerization slurry 318. In further embodiments, the opening 320 faces the direction of the circulating slurry 318. Thus, a portion of the polymerization slurry 324 containing polymer solids is removed from the circulating polymerization slurry 318 over an area from near or adjacent the inside wall 312 of the loop reactor 1 to a distance extending into the circulating polymerization slurry 318. Accordingly, a higher weight percentage of polymer solids may be formed within the conduit 8A than the weight percentage of polymer solids within the otherwise circulating polymerization slurry.

The weight percentage increase of polymer solids may depend upon the location of the discharge conduit 8A along the loop reactor 1, the insertion depth of the discharge conduit 8A within the loop reactor, the size and configuration of the opening 320, the orientation of the opening 320 relative to the direction of the circulating polymerization slurry, and the weight percentage of polymer solids in the circulating polymerization slurry 318. For example, between 1 wt % to 5 wt % calculated increase can be observed with a discharge conduit 8A having an v1 dimension of approximately 5 inches and a h1 dimension of approximately 1 inch, with the discharge conduit 8A positioned 10 ft downstream of a 90 degree bend in the loop reactor 1 in a portion of the loop reactor wall 314 adjacent the ground. The discharge conduit 8A can be extended approximately 5.5 inches into the circulating polymerization slurry stream. The velocity of the circulating polymerization slurry can be of 28 ft/sec to 34 ft/sec with a content of polymer solids of about 48 wt % to about 53 wt %.

Figure 4:
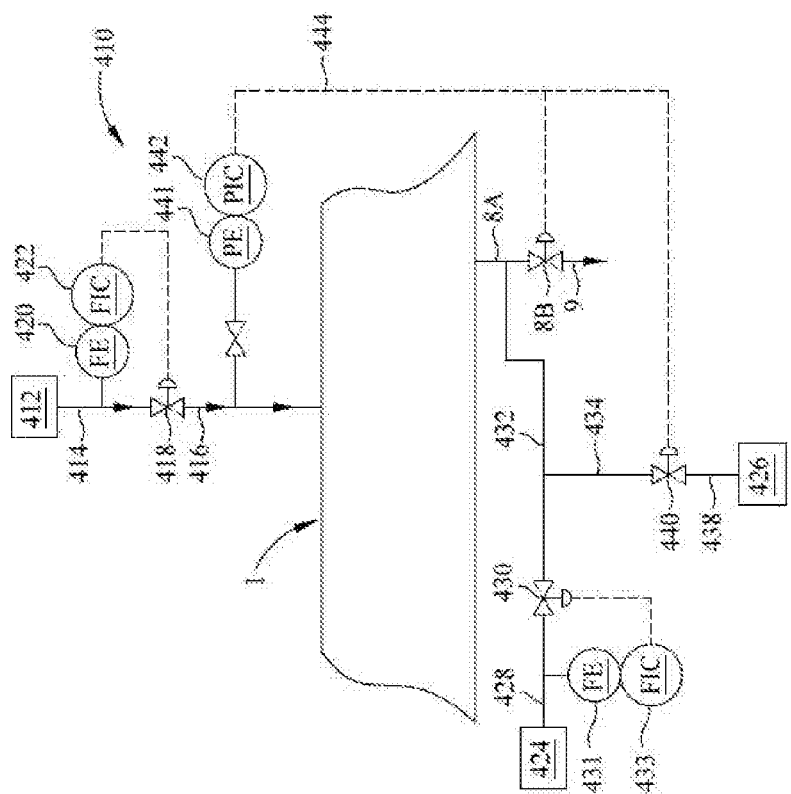
FIG. 4 is a schematic view of a pressure control system, according to an embodiment.

FIG. 4 illustrates a pressure control system 410. The pressure control system 410 operates to maintain substantially uniform pressure within the loop reactor 1 by controlling the discharge of polymerization effluent from the loop reactor 1 via the discharge conduit 8A. The control system 410 also operates to prevent plugging of the discharge conduit 8A by polymer solids during pressure fluctuations within the loop reactor 1 and/or when the flow of polymerization effluent from the discharge conduit 8A to conduit 9 is interrupted and/or stopped.

The pressure control system 410 includes a first inert diluent source 412, such as isobutane, and an inert diluent conduit 414 in communication with a loop reactor conduit 416. The flow of inert diluent through the inert diluent conduit 414 to the loop reactor conduit 416 is controlled by the control valve 418 in concert with a flow element 420 and a flow indicator controller 422. The purpose of metering the flow of inert diluent from the first inert diluent source 412 to the loop reactor 1 is to prevent plugging of the conduit 416 by polymer solids. Thus, a loop reactor pressure element 441 (discussed below), in communication with the loop reactor conduit 416, may more accurately monitor the pressure in the loop reactor 1.

The pressure control system 410 further includes as second inert diluent source 424 and a third inert diluent source 426. Inert diluent, such as isobutane, from the second inert diluent source 424 flows into a conduit 428 towards a control valve 430 which is in fluid communication with a conduit 432. The control valve 430, in concert with a flow element 431 and a flow indicator controller 433, meters the flow of inert diluent from the second inert diluent source 424 into conduit 432. The conduit 432 is in fluid communication with a conduit 434 and the discharge conduit 8A, terminating in the discharge conduit 8A at a point between the loop reactor 1 and the discharge valve 8B. The purpose of metering the flow of inert diluent from the second inert diluent source 422 into the conduit 432 is to prevent plugging of the conduit 432 by polymer solids which might otherwise back flow into the conduit 432 from the discharge conduit 8A. Additionally, the flow of inert diluent from the second inert diluent source 422 also prevents plugging of the conduit 434 and the control valve 440 by polymer solids which might back flow into conduit 432 from the discharge conduit 8A.

Inert diluent from the third inert diluent source 426 flows into a conduit 438 towards a control valve 440 which is in fluid communication with conduit 434. As will be explained in greater detail below, in the event of a sufficient pressure fluctuation within the loop reactor 1, the control valve 440 operates to initiate a sufficient flow under sufficient pressure of inert diluent from the third inert diluent source 426 to purge and/or discharge polymer solids from the discharge conduit 8A into the loop reactor 1. In this instance, the flow of inert diluent from the third inert diluent source 426 into the conduit 432 can be greater than the flow of inert diluent from the second inert diluent source 424 into the conduit 432. For example, the flow of inert diluent from the second inert diluent source 424 to the discharge conduit 8A may be in a range of 0.5 gallons/min to less than 2 gallons/min. The flow of inert diluent from the third inert diluent source 426 to the discharge conduit 8A may be in a range of 2 gallons/min to 20 gallons/min Diluent obtained from first inert diluent source 412, second inert diluent source 424, and third inert diluent source 426 may collectively form all or a portion of the first reactor diluent described herein.

The loop reactor pressure element 441 and a pressure indicating controller 442 perform several functions. As previously mentioned, the pressure element 441 monitors the loop reactor 1 pressure via the conduit 416. In response to the pressure, the loop reactor pressure element 441 generates a signal proportional to the pressure in conduit 416. The signal is conveyed to the pressure indicating controller 442. In response to the signal and a preset pressure value, the pressure indicating controller 442 sends a signal through a signal conduit (illustrated by the broken line 444) to the discharge valve 8B and the control valve 440.

During loop reactor operations, the discharge valve 8B is positioned to permit the flow of polymerization effluent from the discharge conduit 8A to conduit 9. At the same time, the control valve 440 is closed preventing the flow of inert diluent from the third inert diluent source 426 to the discharge conduit. When sufficient pressure fluctuations occur and/or when partial depressurization in the loop reactor 1 are detected by the loop reactor pressure element 441, the signal generated by the pressure indicating controller 442 causes the discharge valve 8B to close and the control valve 440 to open. By closing discharge valve 8B, thus interrupting the discharge from the loop reactor 1, pressure within the loop reactor 1 may be restored. By opening the control valve 440 and flowing sufficient volumes of inert diluent from the third inert diluent source 426 into the discharge conduit 8A under sufficient pressure, polymer solids remaining in the discharge conduit 8A between the discharge valve 8B and the loop reactor 1 may be flushed out of and/or purged from the discharge conduit 8A and into the loop reactor 1. Additionally, by maintaining a sufficient flow of inert diluent, continuous or otherwise, into and/or through the discharge conduit 8A while the discharge valve 8B is closed, the polymer solids within the loop reactor 1 are prevented from entering and/or substantially collecting in the discharge conduit 8A and/or plugging the discharge conduit 8A. Upon return of normal operations, the control valve 440 closes terminating the flow of inert diluent from the third inert diluent source 426 and the discharge valve 8B opens to resume the flow of polymerization effluent through the discharge conduit 8A into the conduit 9.

Embodiments Listing

The present disclosure provides, among others, the following embodiments, each of which may be considered as optionally including any alternate embodiments.

Clause 1. A process for preparing polymers comprising:
introducing a monomer, a first diluent, a catalyst, hydrogen and optional comonomer to a first loop reactor to produce, under polymerization conditions, a first slurry of polymer solids having a first hydrogen concentration and comprising polymers having a molecular weight;
discharging the first slurry of polymer solids from the loop reactor as a first polymerization effluent to a first flash tank, wherein the first flash tank has a seal chamber configured to maintain a volume of a first concentrated polymer slurry to maintain a seal;
separating the first polymerization effluent in the first flash tank to vaporize from about 50% to about 100% of the first diluent and to provide a flash vapor comprising the first diluent and unreacted monomer, and to provide a first concentrated polymer slurry, wherein hydrogen is present in the first concentrated polymer slurry at a second hydrogen concentration that is lower than the first hydrogen concentration;
transferring the first concentrated polymer slurry from the first flash tank to a re-slurry mixer;
introducing a second diluent to the first concentrated polymer slurry to form a second concentrated polymer slurry in the re-slurry mixer; and
discharging the second concentrated polymer slurry from the re-slurry mixer into a second loop reactor.

Clause 2. The process of Clause 1, wherein introducing the monomer, the first diluent, the catalyst, and hydrogen is performed at a temperature of from about 50° C. to about 120° C. and/or a pressure of from about 200 psig to about 800 psig.

Clause 3. The process of Clauses 1 or 2, wherein the monomer is ethylene.

Clause 4. The process of any of Clauses 1 to 3, wherein the first diluent is a $C_3$-$C_5$ saturated aliphatic hydrocarbon.

Clause 5. The process of any of Clauses 1 to 4, wherein the first diluent is isobutane, such as the first diluent comprises or consists of recycled isobutane and the recovered diluent from the first flash drum vapor.

Clause 6. The process of any of Clauses 1 to 5, wherein the second diluent is a $C_3$-$C_5$ saturated aliphatic hydrocarbon.

Clause 7. The process of any of Clauses 1 to 6, wherein the second diluent is isobutane, such as recycled isobutane that has been purified and comprises trace amounts of ethylene (if any).

Clause 8. The process of any of Clauses 1 to 7, wherein the catalyst is selected from the group consisting of a Ziegler-Natta catalyst, a metallocene or single site catalyst, a chrome oxide catalyst, or a combination thereof.

Clause 9. The process of any of Clauses 1 to 8, further comprising introducing a co-catalyst to the first loop reactor.

Clause 10. The process of any of Clauses 1 to 9, wherein the co-catalyst is selected from trimethylaluminum, triethylaluminum, triisobutylaluminum, tri-n-hexylaluminum, tri-n-octylaluminum, tripropylaluminum, or tributylaluminum.

Clause 11. The process of any of Clauses 1 to 10, further comprising introducing a reversible poison to the polymer slurry stream exiting the first loop reactor.

Clause 12. The process of any of Clauses 1 to 11, wherein the reversible poison is carbon monoxide.

Clause 13. The process of any of Clauses 1 to 12, wherein introducing the monomer comprises operating the first loop reactor at a space time yield of about 2.6 lbs/hr-gal or greater.

Clause 14. The process of any of Clauses 1 to 13, wherein the first slurry of polymer solids comprises a homopolymer having a GPC molecular weight distribution with a Mw value of from 10,000 g/mol to about 100,000 g/mol, Mn value of from 3,000 g/mol to about 30,000 g/mol, Mz value of from about 20,000 to about 20,000, and a PDI of from 2.0 to 8.0, as well as a density of from about 0.930 g/cm$^3$ to about 0.980 g/cm$^3$.

Clause 15. The process of any of Clauses 1 to 14, wherein separating the first polymerization effluent comprises operating the first flash tank at a pressure of from about 75 psig to about 200 psig.

Clause 16. The process of any of Clauses 1 to 15, wherein the second hydrogen concentration is lower than the first hydrogen concentration.

Clause 17. The process of any of Clauses 1 to 16, further comprising transferring the flash vapor from an overhead portion of the first flash tank to a separator and condensing a portion of the flash vapor without compression.

Clause 18. The process of any of Clauses 1 to 17, wherein condensing of the flash vapor is performed using a heat exchanger.

Clause 19. The process of any of Clauses 1 to 18, wherein condensing of the flash vapor forms a condensed liquid, and wherein the condensed liquid is transferred to the first loop reactor.

Clause 20. The process of any of Clauses 1 to 19, further comprising venting a liquid accumulator comprising the condensed liquid to remove carbon monoxide in the condensed liquid.

Clause 21. The process of any of Clauses 1 to 20, wherein discharging the first slurry of polymer solids from the first loop reactor as the first polymerization effluent to the first flash tank is performed continuously, and further comprises heating the first polymerization effluent in a line before the first polymerization effluent enters the first flash tank.

Clause 22. The process of any of Clauses 1 to 21, wherein introducing the second diluent to the first concentrated polymer slurry comprises operating the re-slurry mixer at a pressure equal to or lower than the pressure of the first flash tank.

Clause 23. The process of any of Clauses 1 to 22, further comprising:

introducing additional monomer, a comonomer and a third diluent to the second loop reactor, to produce, under polymerization conditions, a second slurry of polymer solids comprising copolymers having a second molecular weight, wherein the second slurry of polymer solids has a third hydrogen concentration lower than the first hydrogen concentration.

Clause 24. The process of Clause 23, wherein the third diluent comprises recovered second reactor diluent and recycle diluent.

Clause 25. The process of any of Clauses 1 to 24, wherein introducing the monomer and the third diluent comprises operating the second loop reactor at a space time yield of from about 2.6 lbs/hr-gal or greater.

Clause 26. The process of any of Clauses 1 to 25, wherein introducing the monomer and the third diluent is performed at a temperature of from about 50° C. to about 120° C. and/or a pressure of from about 200 psig to about 800 psig.

Clause 27. The process of any of Clauses 1 to 26, wherein the monomer is ethylene and the comonomer is one or more $C_3$-$C_8$ alpha-olefin comonomers.

Clause 28. The process of any of Clauses 1 to 27, wherein the third diluent is a $C_3$-$C_5$ saturated aliphatic hydrocarbon.

Clause 29. The process of any of Clauses 1 to 28, wherein the third diluent is isobutane.

Clause 30. The process of any of Clauses 1 to 29, further comprising introducing a second co-catalyst to the second loop reactor.

Clause 31. The process of any of Clauses 1 to 30, wherein the second co-catalyst is selected from trimethylaluminum, triethylaluminum, triisobutylaluminum, tri-n-hexylaluminum, tri-n-octylaluminum, tripropylaluminum, or tributylaluminum.

Clause 32. A process for preparing polymers comprising:

introducing a first monomer, a first diluent, a catalyst, optional comonomer, and optional hydrogen in a first loop reactor to produce, under polymerization conditions, a first slurry of polymer solids comprising a first polymer;

continuously discharging the first slurry of polymer solids from the first loop reactor as a first polymerization effluent to a first flash tank, wherein the first flash tank has a seal chamber configured to maintain a volume of a first concentrated polymer slurry to maintain a seal;

separating the first polymerization effluent in the first flash tank to provide a first flash vapor comprising the first diluent and unreacted first monomer, hydrogen and other non-condensables and to provide a first concentrated polymer slurry in a first flash tank seal chamber;

transferring the first concentrated polymer slurry from the first flash tank seal chamber to a re-slurry mixer;

introducing a second diluent to the first concentrated polymer slurry to form a second concentrated polymer slurry;

transferring the second concentrated polymer slurry from the re-slurry mixer to a second loop reactor via a pump;

introducing additional monomer, a comonomer (or additional comonomer) and a third diluent in the second loop reactor to produce a second slurry of polymer solids comprising a second polymer; and discharging the second slurry of polymer solids from the second loop reactor as a second polymerization effluent to a second flash tank.

Clause 33. The process of any of Clause 32, further comprising:

separating the second polymerization effluent in the second flash tank to provide a second flash vapor comprising the third diluent and unreacted second monomer, comonomer and catalyst poisons, and to provide a third concentrated polymer slurry in a seal chamber of the second flash tank; and transferring the third concentrated polymer slurry from the seal chamber to a third flash tank.

Clause 34. The process of any of Clauses 32 or 33, wherein the first loop reactor has the same volume as the second loop reactor.

Clause 35. The process of any of Clauses 32 to 34, wherein the first loop reactor has a different volume as the second loop reactor.

Clause 36. The process of any of Clauses 32 to 35, wherein low molecular weight polymers are formed in the first loop reactor and high molecular weight copolymers are formed in the second loop reactor.

Clause 37. The process of any of Clauses 32 to 36, wherein high molecular weight polymers are formed in the first loop reactor and low molecular weight polymers are formed in the second loop reactor.

Clause 38. The process of any of Clauses 32 to 37, wherein the second slurry of polymer solids comprises a mixture of low molecular weight homopolymers and high molecular weight copolymers.

Clause 39. The process of any of Clauses 32 to 38, wherein:

the first polymer has a GPC molecular weight distribution with a Mw value of from 100,000 g/mol to about 500,000 g/mol, a Mn value of from 30,000 g/mol to about 300,000 g/mol, a Mz value of from about 200,000 to about 4,000,000, and PDI of from 2.0 to 8.0, and a density of from about 0.900 g/cm$^3$ to about 0.930 g/cm$^3$; and the second polymer has a GPC molecular weight distribution with a Mw value of from 10,000 g/mol to about 100,000 g/mol, a Mn value of from 3,000 g/mol to about 30,000 g/mol, a Mz value of from about 20,000 to about 200,000, and PDI of from 2.0 to 8.0, and a density of from about 0.930 g/cm$^3$ to about 0.980 g/cm$^3$.

Clause 40. The process of any of Clauses 32 to 39, wherein the second slurry of polymer solids comprises a bimodal polymer composition of a low molecular weight homopolymer and a high molecular weight copolymer.

Clause 41. The process of any of Clauses 32 to 40, wherein introducing the second diluent to the first concentrated polymer slurry comprises:

introducing the second diluent in an amount sufficient to transfer the second concentrated polymer slurry to the second reactor; and operating the re-slurry mixer at a pressure equal to or lower than the first high pressure flash tank.

Clause 42. The process of any of Clauses 32 to 41, wherein the first slurry of polymer solids comprises a polymer having a GPC molecular weight distribution with a Mw value of from 10,000 g/mol to about 100,000 g/mol, a Mn value of from 3,000 g/mol to about 30,000 g/mol, a Mz value of from about 20,000 to about 200,000, and PDI of from 2.0 to 8.0, and a density of from about 0.930 g/cm$^3$ to about 0.980 g/cm$^3$.

Clause 43. The process of any of Clauses 32 to 42, wherein the second reactor produces a polymer having a GPC molecular weight distribution with a Mw value of from 100,000 g/mol to about 500,000 g/mol, Mn value of from 30,000 g/mol to about 300,000 g/mol, Mz value of from about 200,000 to about 4,000,000, and a PDI of from 2.0 to 8.0, and a density of from about 0.900 g/cm$^3$ to about 0.930 g/cm$^3$.

Clause 44. The process of Clauses 43, wherein the second slurry reactor effluent comprises a polymer product having a GPC Molecular weight distribution with a Mw value of from 50,000 g/mol to about 1,000,000 g/mol, a Mn value of from 3,000 g/mol to about 50,000 g/mol, a Mz value of from about 400,000 to about 4,000,000, and PDI of from 8.0 to 80.0, and a density of from about 0.930 g/cm$^3$ to about 0.965 g/cm$^3$.

Clause 45. The process of any of Clauses 32 to 44, wherein the second flash tank has a seal chamber configured to maintain a volume of a slurry of polymer solids to maintain a pressure seal.

Clause 46. The process of any of Clauses 32 to 45, wherein the catalyst is selected from the group consisting of a Ziegler-Natta catalyst, a metallocene or single site catalyst, a chrome oxide catalyst, and a combination thereof.

Clause 47. The process of any of Clauses 32 to 46, further comprising introducing a co-catalyst to the first loop reactor.

Clause 48. The process of any of Clauses 32 to 47, wherein the co-catalyst is selected from trimethylaluminum, triethylaluminum, triisobutylaluminum, tri-n-hexylaluminum, tri-n-octylaluminum, tripropylaluminum, or tributylaluminum.

Clause 49. The process of any of Clauses 32 to 48, further comprising introducing carbon monoxide to the effluent of the first loop reactor.

Clause 50. The process of any of Clauses 32 to 49, further comprising introducing a co-catalyst to the second loop reactor.

Clause 51. The process of any of Clauses 32 to 50, wherein the co-catalyst is selected from trimethylaluminum, triethylaluminum, triisobutylaluminum, tri-n-hexylaluminum, tri-n-octylaluminum, tripropylaluminum, or tributylaluminum.

Clause 52. The process of any of Clauses 32 to 51, further comprising introducing oxygen ($O_2$), carbon monoxide (CO), or carbon dioxide ($CO_2$) to effluent from the second loop reactor.

Clause 53. The process of any of Clauses 32 to 52, further comprising transferring the first flash vapor from an overhead portion of the first flash tank to a first separator, wherein transferring the first flash vapor comprises condensing at least a portion of the first flash vapor without compression.

Clause 54. The process of any of Clauses 32 to 53, further comprising transferring the second flash vapor by condensing a portion of the second flash vapor without compression.

Clause 55. The process of any of Clauses 32 to 54, wherein condensing the first flash vapor forms a condensed liquid, and wherein the condensed liquid is recovered back to the first loop reactor.

Clause 56. The process of any of Clauses 33 to 56, further comprising removing catalyst poison(s) from the condensed liquid accumulator drum before the condensed liquid is recovered back to the first loop reactor.

Clause 57. The process of Clause 56, wherein removing the catalyst poison(s) is performed by venting the condensed vapor accumulator.

Clause 58. The process of any of Clauses 33 to 57, wherein condensing the second flash vapor forms a condensed liquid, and wherein the condensed liquid is recovered back to the second loop reactor.

Clause 59. The process of any of Clauses 32 to 59, further comprising removing catalyst poison(s) from the condensed liquid accumulator drum before the condensed liquid is recovered back to the second loop reactor.

Clause 60. The process of Clause 59, wherein removing the catalyst poison(s) is performed by venting the condensed vapor accumulator.

Clause 61. The process of any of Clauses 33 to 60, wherein venting the re-slurry mixer is performed to control pressure in the re-slurry mixer to equal to or less than the pressure of the first flash tank.

Clause 62. The process of any of Clauses 33 to 61, wherein:
separating the first polymerization effluent in the first flash tank is performed at a pressure that is from about 50 psig to 250 psig pressure.

Clause 63. The process of any of Clauses 33 to 62, wherein:
separating the second polymerization effluent in the second flash tank is performed at a pressure that is from about 50 psig to 250 psig.

Clause 64. The process of any of Clauses 33 to 63, wherein the second flash tank is operated at a pressure of from about 75 psig to about 200 psig.

Clause 65. The process of any of Clauses 33 to 64, wherein the third flash tank is operated at a pressure of from about 0.05 psig to about 25 psig.

Clause 66. A polyolefin reactor system comprising:
a first loop reactor coupled via a line to a first flash tank, wherein the first flash tank has a seal chamber configured to maintain a volume of a slurry of polymer solids to maintain a seal;
a re-slurry mixer coupled to the first flash tank; and
a second loop reactor coupled to the re-slurry mixer.

Clause 67. The polyolefin reactor system of Clause 66, wherein the second loop reactor is further coupled to a second flash tank.

Clause 68. The polyolefin reactor system of Clauses 66 or 67, further comprising:
a flash line heater, a separator, and the re-slurry mixer coupled to the first flash tank.

Clause 69. The polyolefin reactor system of any of Clauses 66 to 68, wherein the separator is a high pressure cyclone.

Clause 70. A polyolefin reactor system comprising:
a first loop reactor coupled via a line to a first flash tank, wherein the first flash tank has a seal chamber configured to maintain a volume of a slurry of polymer solids to maintain a seal;
a re-slurry mixer coupled to the first flash tank;
a second loop reactor coupled to the re-slurry mixer;
a second flash tank coupled to the second loop reactor, wherein the second flash tank has a seal chamber configured to maintain a volume of a slurry of polymer solids to maintain a seal; and
a third flash tank coupled to the second flash tank.

Clause 71. The polyolefin reactor system of Clause 70, wherein the first loop reactor and the second loop reactor are in series.

Clause 72. The polyolefin reactor system of Clauses 70 or 71, further comprising:
a separator coupled to the first flash tank and to the re-slurry mixer.

Clause 73. A process for preparing polymers comprising:
introducing a monomer, a first diluent and a catalyst to a first loop reactor to produce, under polymerization conditions, a first slurry of polymer solids comprising polymers having a molecular weight;
discharging the first slurry of polymer solids from the loop reactor as a first polymerization effluent to a first flash tank, wherein the first flash tank has a seal chamber configured to maintain a volume of a first concentrated polymer slurry to maintain a seal;
separating the first polymerization effluent in the first flash tank to vaporize from about 50% to about 100% of the first diluent and provide a flash vapor comprising the first diluent, unreacted monomer, and hydrogen to provide the first concentrated polymer slurry;
transferring the first concentrated polymer slurry from the first flash tank to a re-slurry mixer;
introducing a second diluent to the first concentrated polymer slurry to form a second concentrated polymer slurry in the re-slurry mixer; and
discharging the second concentrated polymer slurry from the re-slurry mixer into a second loop reactor via a pump; and
introducing hydrogen into the second loop reactor.

Clause 74. A process for preparing polymers comprising:
introducing a monomer, a first diluent, a catalyst, and optionally hydrogen, to a first loop reactor to produce, under polymerization conditions, a first slurry of polymer solids comprising first polymers having a molecular weight;
discharging the first slurry of polymer solids from the loop reactor as a first polymerization effluent to a first flash tank, wherein the first flash tank has a seal chamber configured to maintain a volume of a first concentrated slurry of polymer solids to maintain a seal;
separating the first polymerization effluent in the first flash tank to vaporize from about 50% to about 100% of the first diluent and provide a flash vapor comprising the first diluent and unreacted monomer, and to provide the first concentrated polymer slurry, wherein hydrogen is present in the first concentrated polymer slurry at a second hydrogen concentration that is lower than a first hydrogen concentration present in the first slurry of polymer solids;
transferring the first concentrated polymer slurry from the first flash tank to a re-slurry mixer;
introducing a second diluent to the first concentrated polymer slurry to form a second concentrated polymer slurry in the re-slurry mixer;
discharging the second concentrated polymer slurry from the re-slurry mixer into a second loop reactor via a pump; and
introducing a second monomer to a third diluent, and optionally hydrogen, to the second loop reactor to produce, under polymerization conditions, a second slurry of polymer solids.

Clause 75. The process of Clause 74, further comprising introducing comonomer into the first reactor.

Clause 76. The process of Clause 74 or 75, further comprising introducing comonomer into the second reactor.

Clause 77. A process for preparing polymers comprising:
introducing a first monomer, a first diluent, a catalyst, optional comonomer, and optional hydrogen to a first loop reactor to produce, under polymerization conditions, a first slurry of polymer solids comprising a first polymer;
discharging the first slurry of polymer solids from the first loop reactor as a first polymerization effluent to a first flash tank, wherein the first flash tank has a seal chamber configured to maintain a volume of a first concentrated polymer slurry to maintain a seal;
separating the first polymerization effluent in the first flash tank to provide a first flash vapor comprising the first diluent, unreacted first monomer, and hydrogen to provide a first concentrated polymer slurry in the first flash tank seal chamber;
transferring the first concentrated polymer slurry from the first flash tank seal chamber to a re-slurry mixer;
introducing a second diluent to the first concentrated polymer slurry to form a second concentrated polymer slurry;
transferring the second concentrated polymer slurry from the re-slurry mixer to a second loop reactor via a pump;
introducing a second monomer and hydrogen to a third diluent in the second loop reactor to produce a second slurry of polymer solids comprising a second polymer; and
discharging the second slurry of polymer solids from the second loop reactor as a second polymerization effluent to a second flash tank.

Clause 78. The process of any of Clause 77, further comprising:
separating the second polymerization effluent in the second flash tank to provide a second flash vapor comprising the third diluent, unreacted second monomer, and hydrogen to provide a third concentrated polymer slurry in a seal chamber of the second flash tank; and
transferring the third concentrated polymer slurry from the seal chamber to a third flash tank.

Clause 79. The process of Clauses 77 or 78, wherein high molecular weight polymers are formed in the first loop reactor and low molecular weight polymers are formed in the second loop reactor.

Clause 80. The process of any of Clauses 77 to 79, wherein the second slurry of polymer solids comprises a bimodal polymer composition of the first polymer and the second polymer.

Clause 81. The process of any of Clauses 77 to 80, wherein:
the first polymer has a GPC molecular weight distribution with a Mw value of from 100,000 g/mol to about 500,000 g/mol, a Mn value of from 30,000 g/mol to about 300,000 g/mol, a Mz value of from about 200,000 to about 4,000,000, and a PDI of from 2.0 to 8.0 as well as a density of from about 0.900 g/cm$^3$ to about 0.930 g/cm$^3$; and
the second polymer has a GPC molecular weight distribution with a Mw value of from 10,000 g/mol to about 100,000 g/mol, a Mn value of from 3,000 g/mol to about 30,000 g/mol, a Mz value of from about 20,000 to about 200,000, and a PDI of from 2.0 to 8.0 as well as a density of from about 0.930 g/cm$^3$ to about 0.980 g/cm$^3$.

Clause 82. The process of any of Clauses 77 to 81, wherein the second polymerization effluent comprises a polymer product having a GPC molecular weight distribution with a Mw value of from 50,000 g/mol to about 1,000,000 g/mol, a Mn value of from 3,000 g/mol to about 50,000 g/mol, a Mz value of from about 400,000 to about 4,000,000, and a PDI of from 8.0 to 80.0 as well as a density of from about 0.930 g/cm$^3$ to about 0.965 g/cm$^3$.

Clause 83. The process of any of Clauses 77 to 82, wherein introducing the second diluent to the first concentrated polymer slurry comprises:
introducing the second diluent in an amount sufficient to transfer the second concentrated polymer slurry to the second reactor via one or more pumps; and
operating the re-slurry mixer at a pressure equal to or lower than the first high pressure flash tank.

Clause 84. The process of any of Clauses 77 to 83, further comprising introducing carbon monoxide to the first polymerization reactor effluent.

Clause 85. The process of any of Clauses 77 to 84, further comprising introducing oxygen ($O_2$), carbon monoxide (CO), or carbon dioxide ($CO_2$) to the second polymerization reactor effluent.

Overall, the present disclosure provides methods and apparatus that can provide reduced or eliminated hydrogen content in a second reactor in series to provide bimodal polymers at high throughput and reduced cost, as compared to conventional post reactor blends and in-series reactors/processes.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A process for preparing polymers comprising:
   introducing a monomer, a first diluent, a catalyst, hydrogen and optional comonomer to a first loop reactor to produce, under polymerization conditions, a first slurry of polymer solids having a first hydrogen concentration and comprising polymers having a molecular weight;
   discharging the first slurry of polymer solids from the loop reactor as a first polymerization effluent to a first flash tank, wherein the first flash tank has a seal chamber configured to maintain a volume of a first concentrated polymer slurry to maintain a seal;
   separating the first polymerization effluent in the first flash tank to vaporize from about 50% to about 100% of the first diluent and provide a flash vapor comprising the first diluent and unreacted monomer, and to provide the first concentrated polymer slurry, wherein hydrogen is present in the first concentrated polymer slurry at a second hydrogen concentration that is lower than the first hydrogen concentration;
   transferring the first concentrated polymer slurry from the first flash tank to a re-slurry mixer;
   introducing a second diluent to the first concentrated polymer slurry to form a second concentrated polymer slurry in the re-slurry mixer; and
   discharging the second concentrated polymer slurry from the re-slurry mixer into a second loop reactor.

2. The process of claim 1, wherein introducing the monomer, the first diluent, the catalyst, and hydrogen is performed at a temperature of from about 50° C. to about 120° C. and/or a pressure of from about 200 psig to about 800 psig.

3. The process of claim 1, wherein the monomer is ethylene; and further wherein the first and second diluent are each a $C_3$-$C_5$ saturated aliphatic hydrocarbon.

4. The process of claim 3, wherein the first and second diluent are each isobutane.

5. The process of claim 1, further comprising introducing a co-catalyst to the first loop reactor, wherein the co-catalyst is selected from trimethylaluminum, triethylaluminum, triisobutylaluminum, tri-n-hexylaluminum, tri-n-octylaluminum, tripropylaluminum, or tributylaluminum.

6. The process of claim 1, further comprising introducing a reversible poison to the polymer slurry stream exiting the first loop reactor.

7. The process of claim 6, wherein the reversible poison is carbon monoxide.

8. The process of claim 1, wherein introducing the monomer comprises operating the first loop reactor at a space time yield of about 2.6 lbs/hr-gal or greater.

9. The process of claim 1, wherein the first slurry of polymer solids comprises a homopolymer having a GPC molecular weight distribution with a Mw value of from 10,000 g/mol to about 100,000 g/mol, Mn value of from 3,000 g/mol to about 30,000 g/mol, Mz value of from about 20,000 to about 200,000 g/mol, and PDI of from 2.0 to 8.0, and a density of from about 0.930 g/cm$^3$ to about 0.980 g/cm$^3$.

10. The process of claim 1, wherein separating the first polymerization effluent comprises operating the first flash tank at a pressure of from about 75 psig to about 200 psig.

11. The process of claim 1, further comprising transferring the flash vapor from an overhead portion of the first flash tank to a separator and condensing the flash vapor without compression.

12. The process of claim 11, wherein condensing the flash vapor is performed using a heat exchanger, and wherein the process further comprises introducing a condensed liquid to an accumulator and venting the accumulator to remove one or more poisons, wherein condensing the flash vapor forms the condensed liquid, and wherein the condensed liquid is returned to the first loop reactor.

13. The process of claim 12, further comprising removing one or more catalyst poisons from the condensed liquid accumulator drum before the condensed liquid is returned to the first loop reactor.

14. The process of claim 1, wherein discharging the first slurry of polymer solids further comprises heating the first polymerization effluent in a line heater before the first polymerization effluent enters the first flash tank.

15. The process of claim 1, wherein introducing the second diluent to the first concentrated polymer slurry comprises operating the re-slurry mixer at a pressure equal to or lower than the pressure of the first flash tank.

16. The process of claim 1, further comprising:
introducing a second monomer, a comonomer and a third diluent, to the second loop reactor, to produce, under polymerization conditions, a second slurry of polymer solids comprising copolymers having a second molecular weight, wherein the second slurry of polymer solids has a third hydrogen concentration lower than the first hydrogen concentration; and
introducing a second co-catalyst to the second loop reactor, wherein the second co-catalyst is selected from trimethylaluminum, triethylaluminum, triisobutylaluminum, tri-n-hexylaluminum, tri-n-octylaluminum, tripropylaluminum, or tributylaluminum.

17. The process of claim 16, wherein the second monomer is ethylene and the comonomer is one or more $C_4$-$C_8$ alpha-olefin comonomers; and further wherein the third diluent is isobutane.

18. The process of claim 16, further comprising.

19. A process for preparing polymers comprising:
introducing a first monomer, a first diluent, a catalyst, co-catalyst, optional comonomer, and optional hydrogen in a first loop reactor to produce, under polymerization conditions, a first slurry of polymer solids comprising a first polymer;
discharging the first slurry of polymer solids from the first loop reactor as a first polymerization effluent to a first flash tank, wherein the first flash tank has a seal chamber configured to maintain a volume of a first concentrated polymer slurry to maintain a seal;
separating the first polymerization effluent in the first flash tank to provide a first flash vapor comprising the first diluent and unreacted first monomer, and to provide a first concentrated polymer slurry in the first flash tank seal chamber;
transferring the first concentrated polymer slurry from the first flash tank seal chamber to a re-slurry mixer;
introducing a second diluent to the first concentrated polymer slurry to form a second concentrated polymer slurry;
transferring the second concentrated polymer slurry from the re-slurry mixer to a second loop reactor via one or more pumps in series;
introducing a second monomer and hydrogen to a third diluent in the second loop reactor to produce a second slurry of polymer solids comprising a second polymer; and
discharging the second slurry of polymer solids from the second loop reactor as a second polymerization effluent to a second flash tank.

20. The process of claim 19, further comprising:
separating the second polymerization effluent in the second flash tank to provide a second flash vapor comprising the third diluent and unreacted second monomer, and to provide a third concentrated polymer slurry in a seal chamber of the second flash tank; and
transferring the second concentrated polymer slurry from the seal chamber to a third flash tank or a low pressure purge column.

21. The process of claim 20, wherein high molecular weight polymers are formed in the first loop reactor and low molecular weight polymers are formed in the second loop reactor; and further wherein the second slurry of polymer solids comprises a bimodal polymer composition of the first polymer and the second polymer.

22. The process of claim 19, wherein:
the first polymer has a GPC Molecular weight distribution with a Mw value of from 100,000 g/mol to about 500,000 g/mol, a Mn value of from 30,000 g/mol to about 300,000 g/mol, a Mz value of from about 200,000 to about 4,000,000, and PDI of from 2.0 to 8.0, and a density of from about 0.900 g/cm$^3$ to about 0.930 g/cm$^3$; and
the second polymer has a GPC Molecular weight distribution with a Mw value of from 10,000 g/mol to about 100,000 g/mol, a Mn value of from 3,000 g/mol to about 30,000 g/mol, a Mz value of from about 20,000 to about 200,000, and PDI of from 2.0 to 8.0, and a density of from about 0.930 g/cm$^3$ to about 0.980 g/cm$^3$.

23. The process of claim 19, wherein the second polymerization effluent comprises a polymer product having a GPC Molecular weight distribution with a Mw value of from 50,000 g/mol to about 1,000,000 g/mol, a Mn value of from 3,000 g/mol to about 50,000 g/mol, a Mz value of from about 400,000 to about 4,000,000, and PDI of from 8.0 to 80.0, and a density of from about 0.930 g/cm$^3$ to about 0.965 g/cm$^3$.

24. The process of claim 19, wherein introducing the second diluent to the first concentrated polymer slurry comprises:
introducing the second diluent in an amount sufficient to transfer the second concentrated polymer slurry to the second reactor via one or more pumps in series; and
operating the re-slurry mixer at a pressure equal to or lower than the first high pressure flash tank.

* * * * *